(12) United States Patent
Chen et al.

(10) Patent No.: US 11,704,472 B2
(45) Date of Patent: Jul. 18, 2023

(54) STANDARD CELLS AND VARIATIONS THEREOF WITHIN A STANDARD CELL LIBRARY

(71) Applicant: Taiwan Semiconductor Manufacturing Co., Ltd., Hsinchu (TW)

(72) Inventors: Sheng-Hsiung Chen, Zhubei (TW); Jerry Chang-Jui Kao, Taipei (TW); Fong-Yuan Chang, Hsinchu County (TW); Po-Hsiang Huang, Tainan (TW); Shao-Huan Wang, Taichung (TW); XinYong Wang, Shanghai (TW); Yi-Kan Cheng, Taipei (TW); Chun-Chen Chen, Hsinchu County (TW)

(73) Assignee: Taiwan Semiconductor Manufacutring Co., Ltd., Hsinchu (TW)

( * ) Notice: Subject to any disclaimer, the term of this patent is extended or adjusted under 35 U.S.C. 154(b) by 0 days.

(21) Appl. No.: 17/523,600

(22) Filed: Nov. 10, 2021

(65) Prior Publication Data

US 2022/0067266 A1    Mar. 3, 2022

Related U.S. Application Data

(63) Continuation of application No. 16/912,061, filed on Jun. 25, 2020, now Pat. No. 11,182,533, which is a
(Continued)

(51) Int. Cl.
*G06F 30/00*    (2020.01)
*G06F 30/398*    (2020.01)
(Continued)

(52) U.S. Cl.
CPC .......... *G06F 30/398* (2020.01); *G06F 30/394* (2020.01); *H01L 27/0207* (2013.01);
(Continued)

(58) Field of Classification Search
CPC ...... G06F 30/398; G06F 30/394; G06F 30/18; G06F 30/39; G06F 2111/04; G06F 2111/20; G06F 2119/18; H01L 27/0207
See application file for complete search history.

(56) References Cited

U.S. PATENT DOCUMENTS 4,580,228 A *  4/1986  Noto ..................... G06F 30/394
                                                              716/135
4,905,144 A *  2/1990  Hansen .................. G06F 30/18
                                                              700/28
(Continued)

FOREIGN PATENT DOCUMENTS

CN        107463995 A  * 12/2017  ............. G06F 30/20
CN        107735864 A  *  2/2018  ......... H01L 27/0886
(Continued)

OTHER PUBLICATIONS

Adya et al., Combinatorial Techniques for Mixed-Size Placement, ACM Transactions on Design Automation of Electronic Systems, Jan. 2005, pp. 58-90, vol. 10, No. 1.
(Continued)

*Primary Examiner* — Naum Levin
(74) *Attorney, Agent, or Firm* — Sterne, Kessler, Goldstein & Fox P.L.L.C.

(57) ABSTRACT

Standard cell libraries include one or more standard cells and one or more corresponding standard cell variations. The one or more standard cell variations are different from their one or more standard cells in terms of geometric shapes, locations of the geometric shapes, and/or interconnections between the geometric shapes. The exemplary systems and
(Continued)

methods described herein selectively choose from among the one or more standard cells and/or the one or more standard cell variations to form an electronic architectural design for an electronic device. In some situations, some of the one or more standard cells are unable to satisfy one or more electronic design constraints imposed by a semiconductor foundry and/or semiconductor technology node when placed onto the electronic device design real estate. In these situations, the one or more standard cell variations corresponding to these standard cells are placed onto the electronic device design real estate.

21 Claims, 10 Drawing Sheets

Related U.S. Application Data continuation of application No. 15/800,693, filed on Nov. 1, 2017, now Pat. No. 10,741,539.

(60) Provisional application No. 62/552,049, filed on Aug. 30, 2017.

(51) Int. Cl.
- G06F 30/394 (2020.01)
- H01L 27/02 (2006.01)
- G06F 111/04 (2020.01)
- G06F 30/18 (2020.01)
- G06F 119/18 (2020.01)
- G06F 111/20 (2020.01)

(52) U.S. Cl.
CPC .......... *G06F 30/18* (2020.01); *G06F 2111/04* (2020.01); *G06F 2111/20* (2020.01); *G06F 2119/18* (2020.01)

(56) References Cited

U.S. PATENT DOCUMENTS

| | | | | |
|---|---|---|---|---|
| 5,182,719 A * | | 1/1993 | Kuroda | H01L 27/105 438/129 |
| 5,223,733 A * | | 6/1993 | Doi | H01L 23/5225 257/659 |
| 5,252,507 A * | | 10/1993 | Hively | H01L 27/0207 438/6 |
| 5,270,944 A * | | 12/1993 | Kuroda | H01L 27/105 438/129 |
| 5,315,130 A * | | 5/1994 | Hively | H01L 27/0207 257/691 |
| 5,420,800 A * | | 5/1995 | Fukui | G06F 30/39 716/135 |
| 5,459,673 A | | 10/1995 | Carmean et al. | |
| 5,477,467 A * | | 12/1995 | Rugg | H01L 27/0207 716/132 |
| 5,506,788 A * | | 4/1996 | Cheng | G06F 30/392 716/135 |
| 5,570,045 A * | | 10/1996 | Erdal | G06F 30/394 327/293 |
| 5,763,907 A * | | 6/1998 | Dallavalle | H01L 27/0207 257/202 |
| 5,790,841 A * | | 8/1998 | Scherer | G06F 30/394 713/503 |
| 5,801,959 A * | | 9/1998 | Ding | G06F 30/394 716/129 |
| 5,966,517 A * | | 10/1999 | Cronin, III | H01L 27/0207 716/112 |
| 6,066,886 A * | | 5/2000 | Egawa | H01L 27/0207 257/E27.097 |
| 6,385,761 B1 * | | 5/2002 | Breid | H01L 27/0207 716/133 |
| 6,453,447 B1 | | 9/2002 | Gardner et al. | |
| 6,467,074 B1 | | 10/2002 | Katsioulas et al. | |
| 6,756,242 B1 * | | 6/2004 | Regan | H01L 27/0207 716/112 |
| 6,838,713 B1 * | | 1/2005 | Gheewala | H01L 27/0207 257/574 |
| 6,868,530 B2 | | 3/2005 | Wagner et al. | |
| 7,191,425 B1 * | | 3/2007 | Malik | G06F 30/39 706/2 |
| 7,225,423 B2 * | | 5/2007 | Bhattacharya | G06F 30/30 716/135 |
| 7,246,337 B2 * | | 7/2007 | Andreev | G06F 30/392 716/122 |
| 7,269,803 B2 * | | 9/2007 | Khakzadi | G06F 30/392 716/120 |
| 7,325,214 B2 | | 1/2008 | Liao | |
| 7,343,581 B2 | | 3/2008 | Becker | |
| 7,350,173 B1 * | | 3/2008 | Ang | G06F 30/398 716/114 |
| 7,496,862 B2 * | | 2/2009 | Chang | H01L 27/11807 716/139 |
| 7,506,295 B1 * | | 3/2009 | Teig | G06F 30/392 716/135 |
| 7,543,260 B2 | | 6/2009 | Ueda | |
| 7,562,326 B2 | | 7/2009 | Wang et al. | |
| 7,564,077 B2 * | | 7/2009 | Ko | H01L 27/0207 257/206 |
| 7,653,884 B2 | | 1/2010 | Furnish et al. | |
| 7,739,627 B2 | | 6/2010 | Chew et al. | |
| 7,966,596 B2 | | 6/2011 | Lu et al. | |
| 7,979,829 B2 * | | 7/2011 | Smayling | G06F 30/398 716/119 |
| 8,024,695 B2 * | | 9/2011 | Reis | G06F 30/30 716/132 |
| 8,037,441 B2 * | | 10/2011 | Ringe | G06F 30/394 716/122 |
| 8,079,008 B2 * | | 12/2011 | Penzes | G06F 30/327 716/122 |
| 8,214,778 B2 | | 7/2012 | Quandt et al. | |
| 8,468,488 B1 * | | 6/2013 | Burstein | G06F 30/394 716/113 |
| 8,490,043 B2 * | | 7/2013 | Gupta | G06F 30/36 716/135 |
| 8,543,958 B2 | | 9/2013 | Chen et al. | |
| 8,549,447 B2 * | | 10/2013 | Eisenstadt | H01L 23/5225 716/120 |
| 8,612,914 B2 | | 12/2013 | Sherlekar et al. | |
| 8,631,366 B2 | | 1/2014 | Hou et al. | |
| 8,645,893 B1 | | 2/2014 | Yeung et al. | |
| 8,661,388 B2 | | 2/2014 | Chen et al. | |
| 8,710,671 B2 | | 4/2014 | Bobba et al. | |
| 8,726,217 B2 * | | 5/2014 | Gullette | G06F 30/398 716/139 |
| 8,739,104 B1 | | 5/2014 | Penzes et al. | |
| 8,775,999 B2 | | 7/2014 | Chueh et al. | |
| 8,782,576 B1 * | | 7/2014 | Bowers | H01L 27/0207 716/139 |
| 8,832,624 B1 * | | 9/2014 | Shroff | G06F 30/398 716/112 |
| 8,832,629 B2 * | | 9/2014 | Rozen | G06F 30/394 716/126 |
| 8,878,303 B2 * | | 11/2014 | Hatamian | G06F 30/398 716/120 |
| 8,898,610 B1 * | | 11/2014 | Tagore-Brage | G06F 30/30 716/119 |
| 8,904,319 B2 | | 12/2014 | Bist et al. | |
| 8,935,643 B2 * | | 1/2015 | Salem | G06F 30/398 716/112 |
| 8,959,742 B2 | | 2/2015 | Frederick, Jr. et al. | |
| 9,009,642 B1 * | | 4/2015 | Saha | G06F 30/398 716/132 |
| 9,048,121 B2 | | 6/2015 | Kawa et al. | |
| 9,087,170 B2 | | 7/2015 | Hsu et al. | |
| 9,165,103 B1 * | | 10/2015 | Sal | G06F 30/394 |
| 9,171,119 B2 * | | 10/2015 | Aenuganti | G06F 30/398 |
| 9,177,096 B2 | | 11/2015 | Sundareswaran et al. | |
| 9,292,648 B1 * | | 3/2016 | Chandra | G06F 30/394 |

(56) References Cited

U.S. PATENT DOCUMENTS

| | | | |
|---|---|---|---|
| 9,424,387 B2 | 8/2016 | Quandt et al. | |
| 9,547,740 B2* | 1/2017 | Moroz | G06F 30/39 |
| 9,704,846 B1 | 7/2017 | Haigh et al. | |
| 9,705,491 B1* | 7/2017 | Durnan | H03K 17/6871 |
| 9,727,685 B2* | 8/2017 | Yuan | G06F 30/394 |
| 9,767,239 B1* | 9/2017 | Buck | G06F 30/367 |
| 9,780,002 B1* | 10/2017 | Dai | H01L 21/26506 |
| 9,852,253 B2 | 12/2017 | Manohar et al. | |
| 9,947,590 B1* | 4/2018 | Pritchard | H01L 29/0847 |
| 10,031,994 B1* | 7/2018 | Liu | G06F 30/392 |
| 10,083,269 B2 | 9/2018 | De Dood et al. | |
| 10,162,925 B2 | 12/2018 | Chuang et al. | |
| 10,290,653 B2 | 5/2019 | Chen et al. | |
| 10,296,700 B1* | 5/2019 | Bai | G06F 30/394 |
| 10,331,841 B1* | 6/2019 | Ginetti | G06F 30/392 |
| 10,402,528 B2 | 9/2019 | Park et al. | |
| 10,521,545 B2* | 12/2019 | Wang | G03F 1/36 |
| 10,534,883 B1* | 1/2020 | Bai | G06F 30/327 |
| 10,741,539 B2 | 8/2020 | Chen et al. | |
| 10,747,935 B2* | 8/2020 | Li | G06F 30/398 |
| 11,120,192 B1* | 9/2021 | Xiang | G06F 30/394 |
| 11,132,486 B1* | 9/2021 | Prasad | G06F 30/3312 |
| 11,144,703 B1* | 10/2021 | Wang | G06F 30/30 |
| 2001/0052624 A1* | 12/2001 | Houston | G11C 11/412 |
| | | | 257/E27.099 |
| 2002/0006695 A1* | 1/2002 | Hatsch | G06F 30/39 |
| | | | 257/E27.105 |
| 2003/0011004 A1* | 1/2003 | Anzai | G11C 15/00 |
| | | | 257/200 |
| 2003/0066037 A1* | 4/2003 | Patra | G06F 30/23 |
| | | | 716/113 |
| 2003/0084418 A1* | 5/2003 | Regan | G06F 30/39 |
| | | | 716/103 |
| 2004/0040007 A1* | 2/2004 | Harn | G06F 30/392 |
| | | | 716/122 |
| 2004/0053429 A1* | 3/2004 | Muranaka | G05B 19/128 |
| | | | 257/E23.179 |
| 2004/0123262 A1* | 6/2004 | Shirota | G06F 30/394 |
| | | | 716/134 |
| 2005/0156200 A1* | 7/2005 | Kinoshita | H01L 27/0207 |
| | | | 257/E27.108 |
| 2005/0172253 A1* | 8/2005 | Osanai | G06F 30/392 |
| | | | 716/112 |
| 2005/0182603 A1* | 8/2005 | Freitas | G06F 30/20 |
| | | | 703/2 |
| 2005/0198601 A1* | 9/2005 | Kuang | G06F 30/33 |
| | | | 716/108 |
| 2005/0246676 A1* | 11/2005 | Sadakane | G06F 30/394 |
| | | | 716/124 |
| 2006/0018181 A1* | 1/2006 | Matsunaga | H01L 27/11524 |
| | | | 257/E27.103 |
| 2006/0138464 A1* | 6/2006 | Shimamura | G06F 30/392 |
| | | | 257/E27.108 |
| 2006/0142988 A1* | 6/2006 | Akiyama | G06F 30/20 |
| | | | 703/14 |
| 2006/0225016 A1* | 10/2006 | Fukasawa | G06F 30/39 |
| | | | 257/E27.105 |
| 2007/0029621 A1* | 2/2007 | Tatsumi | H01L 27/0207 |
| | | | 257/371 |
| 2007/0033548 A1* | 2/2007 | Tatsumi | H01L 27/11898 |
| | | | 257/E27.11 |
| 2007/0094633 A1* | 4/2007 | Andreev | G06F 30/394 |
| | | | 716/123 |
| 2007/0101306 A1* | 5/2007 | Bowers | G06F 30/327 |
| | | | 716/121 |
| 2007/0101307 A1* | 5/2007 | Ueda | G06F 30/39 |
| | | | 716/136 |
| 2007/0150846 A1* | 6/2007 | Furnish | G06F 30/39 |
| | | | 703/2 |
| 2007/0277137 A1* | 11/2007 | Savithri | G06F 30/39 |
| | | | 716/132 |
| 2007/0277139 A1* | 11/2007 | Kurokawa | G06F 30/39 |
| | | | 716/135 |
| 2008/0040698 A1* | 2/2008 | Ferrari | H01L 27/0207 |
| | | | 716/133 |
| 2008/0043522 A1* | 2/2008 | Fuji | G11C 13/0004 |
| | | | 365/174 |
| 2008/0134106 A1* | 6/2008 | Riviere-Cazaux | G06F 30/39 |
| | | | 716/132 |
| 2008/0137394 A1* | 6/2008 | Shimano | G11C 11/4094 |
| | | | 365/72 |
| 2008/0276215 A1* | 11/2008 | Higuchi | G06N 3/126 |
| | | | 716/55 |
| 2009/0079465 A1* | 3/2009 | Sasaki | H01L 27/11803 |
| | | | 326/21 |
| 2009/0173972 A1* | 7/2009 | Kishishita | H01L 27/0207 |
| | | | 257/E27.07 |
| 2009/0178013 A1* | 7/2009 | Wang | G06F 30/394 |
| | | | 716/132 |
| 2009/0184759 A1* | 7/2009 | Ishihara | H01L 27/0207 |
| | | | 327/565 |
| 2009/0193374 A1* | 7/2009 | Fujimoto | G06F 30/3312 |
| | | | 716/113 |
| 2009/0224356 A1* | 9/2009 | Chandra | G06F 30/398 |
| | | | 716/113 |
| 2009/0249275 A1* | 10/2009 | Gotou | G06F 30/394 |
| | | | 716/122 |
| 2009/0267124 A1* | 10/2009 | Bosshard | H01L 27/0811 |
| | | | 257/296 |
| 2009/0271753 A1* | 10/2009 | Quandt | H01L 27/11803 |
| | | | 716/119 |
| 2009/0278222 A1* | 11/2009 | Chadwick | H01L 27/0207 |
| | | | 257/E27.001 |
| 2009/0290439 A1* | 11/2009 | Chang | H01L 27/1104 |
| | | | 365/189.16 |
| 2009/0307640 A1* | 12/2009 | Chapman | G06F 30/3323 |
| | | | 716/136 |
| 2010/0049477 A1* | 2/2010 | Sivan | G06F 30/13 |
| | | | 703/1 |
| 2010/0107133 A1* | 4/2010 | Nakagawa | G06F 30/39 |
| | | | 716/53 |
| 2010/0115484 A1 | 5/2010 | Frederick | |
| 2010/0177544 A1* | 7/2010 | Nevers | G11C 17/12 |
| | | | 365/104 |
| 2010/0235804 A1* | 9/2010 | Ohtsuka | H05K 3/0005 |
| | | | 716/137 |
| 2010/0281446 A1* | 11/2010 | Hou | G06F 30/39 |
| | | | 716/113 |
| 2011/0020986 A1* | 1/2011 | Houston | H01L 27/11 |
| | | | 438/129 |
| 2011/0185337 A1* | 7/2011 | Kellgren | G06F 30/30 |
| | | | 716/139 |
| 2011/0231811 A1* | 9/2011 | Tang | G06F 30/367 |
| | | | 716/108 |
| 2011/0272776 A1* | 11/2011 | Omura | H01L 27/11807 |
| | | | 257/E25.001 |
| 2012/0001270 A1* | 1/2012 | Kenneth | H01L 27/11 |
| | | | 257/E27.098 |
| 2012/0136641 A1* | 5/2012 | Fung | E21B 43/00 |
| | | | 703/10 |
| 2012/0173219 A1* | 7/2012 | Rodriguez | G06F 30/23 |
| | | | 703/9 |
| 2012/0280282 A1* | 11/2012 | Wu | H01L 27/101 |
| | | | 257/209 |
| 2013/0001649 A1* | 1/2013 | Shimizu | G11C 11/4097 |
| | | | 257/E27.06 |
| 2013/0069169 A1* | 3/2013 | Kwon | G06F 30/327 |
| | | | 257/E27.059 |
| 2013/0086543 A1* | 4/2013 | Agarwal | G06F 30/392 |
| | | | 716/119 |
| 2013/0090907 A1* | 4/2013 | Maliassov | G06F 9/544 |
| | | | 703/10 |
| 2013/0116993 A1* | 5/2013 | Maliassov | G01V 9/00 |
| | | | 703/2 |
| 2013/0125077 A1* | 5/2013 | Rozen | G06F 30/392 |
| | | | 716/119 |
| 2013/0126978 A1* | 5/2013 | Becker | H01L 27/0886 |
| | | | 257/369 |

(56) References Cited

U.S. PATENT DOCUMENTS

| | | | |
|---|---|---|---|
| 2013/0173239 A1* | 7/2013 | Uemura | G06F 30/20 703/2 |
| 2013/0242633 A1* | 9/2013 | Liaw | H01L 27/11226 365/72 |
| 2013/0320454 A1* | 12/2013 | Suzuki | H01L 29/0692 438/197 |
| 2014/0067344 A1* | 3/2014 | Kawai | H01M 10/482 703/2 |
| 2014/0115546 A1* | 4/2014 | Wang | G06F 30/398 716/55 |
| 2014/0122003 A1* | 5/2014 | Jiang | G06Q 10/04 702/61 |
| 2014/0178610 A1* | 6/2014 | Clavelle | F16L 9/006 703/2 |
| 2014/0189680 A1* | 7/2014 | Kripalani | G06F 8/61 717/176 |
| 2014/0210014 A1* | 7/2014 | Ma | H01L 21/823475 257/379 |
| 2014/0217513 A1* | 8/2014 | Hayashi | G06F 30/39 257/369 |
| 2014/0282300 A1* | 9/2014 | Katakamsetty | G06F 30/398 716/53 |
| 2014/0350904 A1* | 11/2014 | Shimanuki | G01N 3/32 703/2 |
| 2014/0370416 A1* | 12/2014 | Alhazmi | H01M 8/04007 703/2 |
| 2015/0057828 A1* | 2/2015 | Civilini | G05D 23/1917 700/299 |
| 2015/0089457 A1* | 3/2015 | Agarwal | G03F 1/70 716/52 |
| 2015/0143309 A1 | 5/2015 | De Dood et al. | |
| 2015/0145070 A1* | 5/2015 | Song | H01L 21/28123 438/694 |
| 2015/0161319 A1* | 6/2015 | Hsu | G06F 30/398 716/123 |
| 2015/0220311 A1* | 8/2015 | Salter | G06F 8/34 717/105 |
| 2015/0270214 A1* | 9/2015 | Chuang | G06F 30/394 716/120 |
| 2015/0278704 A1* | 10/2015 | Kim | G06F 30/20 703/2 |
| 2016/0049369 A1* | 2/2016 | Heo | H01L 27/11807 327/540 |
| 2016/0055283 A1 | 2/2016 | Oh et al. | |
| 2016/0055284 A1* | 2/2016 | Baek | G06F 30/392 716/119 |
| 2016/0085898 A1 | 3/2016 | Manohar et al. | |
| 2016/0085904 A1 | 3/2016 | Song et al. | |
| 2016/0125555 A1* | 5/2016 | Branets | G06Q 10/067 705/348 |
| 2016/0154918 A1* | 6/2016 | Li | G06F 30/367 716/113 |
| 2016/0180002 A1 | 6/2016 | Park et al. | |
| 2016/0283641 A1 | 9/2016 | Bou-Ghazale et al. | |
| 2016/0335389 A1* | 11/2016 | Yuan | G06F 30/392 |
| 2016/0356677 A1* | 12/2016 | Bollas | G06F 30/20 |
| 2017/0012048 A1* | 1/2017 | Tsuboi | H01L 21/84 |
| 2017/0032073 A1* | 2/2017 | Chen | G06F 30/394 |
| 2017/0053057 A1* | 2/2017 | Riviere-Cazaux | G06F 30/398 |
| 2017/0068769 A1 | 3/2017 | Singh et al. | |
| 2017/0083654 A1* | 3/2017 | Chuang | G06F 30/392 |
| 2017/0161424 A1* | 6/2017 | Tsai | G06F 30/398 |
| 2017/0186706 A1* | 6/2017 | Guilley | H01L 23/573 |
| 2017/0228489 A1* | 8/2017 | Hellner | G06F 30/394 |
| 2017/0243788 A1* | 8/2017 | Shimbo | H01L 21/82 |
| 2017/0243888 A1* | 8/2017 | Shimbo | H01L 23/66 |
| 2017/0256548 A1* | 9/2017 | Hsu | H01L 27/0207 |
| 2017/0271317 A1* | 9/2017 | Gotou | H01L 27/0629 |
| 2017/0277819 A1* | 9/2017 | Kim | G06F 30/39 |
| 2017/0294430 A1 | 10/2017 | Seo et al. | |
| 2017/0323046 A1* | 11/2017 | Hsu | G06F 30/398 |
| 2017/0323902 A1* | 11/2017 | Zeng | H01L 27/0207 |
| 2017/0344692 A1* | 11/2017 | Oh | G06F 30/398 |
| 2017/0345809 A1* | 11/2017 | Chang | H01L 27/0207 |
| 2018/0068043 A1* | 3/2018 | Frisch | G06F 30/392 |
| 2018/0068046 A1* | 3/2018 | Lin | G06F 30/394 |
| 2018/0102354 A1* | 4/2018 | Wang | H01L 23/5286 |
| 2018/0107780 A1 | 4/2018 | Chen et al. | |
| 2018/0138330 A1* | 5/2018 | Choi | H01L 51/44 |
| 2018/0144082 A1* | 5/2018 | Hanchinal | G03F 1/36 |
| 2018/0150589 A1 | 5/2018 | Yang et al. | |
| 2018/0188415 A1* | 7/2018 | Imhof | G01V 99/005 |
| 2018/0204765 A1* | 7/2018 | Song | H01L 21/3086 |
| 2018/0314783 A1 | 11/2018 | Moroz | |
| 2018/0322436 A1* | 11/2018 | Sotiroudas | G06Q 50/02 |
| 2018/0342462 A1* | 11/2018 | Kuchanuri | H03K 19/173 |
| 2018/0365363 A1* | 12/2018 | Heilprin | G06F 30/367 |
| 2019/0001657 A1* | 1/2019 | Matusik | B29C 64/386 |
| 2019/0042689 A1* | 2/2019 | Chan | G06F 30/392 |
| 2019/0057179 A1* | 2/2019 | Lee | G06F 30/398 |
| 2019/0065650 A1* | 2/2019 | Pelloie | H01L 27/0207 |
| 2019/0094709 A1* | 3/2019 | Chen | G03F 1/70 |
| 2019/0121929 A1* | 4/2019 | Chen | G06F 30/392 |
| 2019/0138673 A1* | 5/2019 | Roberts | G06T 17/10 |
| 2019/0147133 A1* | 5/2019 | Lin | G06F 30/392 716/122 |
| 2019/0155984 A1* | 5/2019 | Chen | G06F 30/39 |
| 2019/0236239 A1* | 8/2019 | Lin | G06F 30/398 |
| 2019/0294754 A1* | 9/2019 | Roberts | G06F 30/17 |
| 2019/0303523 A1* | 10/2019 | Xu | G06F 30/392 |
| 2019/0392106 A1* | 12/2019 | Northrop | G06F 30/398 |
| 2019/0392110 A1* | 12/2019 | Huda | H01L 27/0207 |
| 2020/0004912 A1* | 1/2020 | Hsu | G06F 30/392 |
| 2020/0019666 A1* | 1/2020 | Lai | H01L 27/0207 |
| 2020/0019667 A1* | 1/2020 | Lin | H01L 27/0207 |
| 2020/0074042 A1* | 3/2020 | Biswas | G06F 30/398 |
| 2020/0082032 A1* | 3/2020 | Hills | G06F 30/367 |
| 2020/0082035 A1* | 3/2020 | Saito | G06F 17/16 |
| 2020/0082036 A1* | 3/2020 | Saito | G06F 30/15 |
| 2020/0089840 A1* | 3/2020 | Wang | G03F 1/36 |
| 2020/0151297 A1* | 5/2020 | Kao | G06F 30/392 |
| 2020/0159882 A1* | 5/2020 | Shah | G06F 30/392 |
| 2020/0167439 A1* | 5/2020 | Mailoa | G06N 3/0454 |
| 2020/0209832 A1* | 7/2020 | Behandish | G06F 30/20 |
| 2020/0226229 A1* | 7/2020 | Liu | G06F 30/398 |
| 2020/0271801 A1* | 8/2020 | Kayum | G06F 9/5066 |
| 2020/0328202 A1 | 10/2020 | Chen et al. | |
| 2020/0350305 A1* | 11/2020 | Yamagami | H01L 29/0676 |
| 2021/0020623 A1* | 1/2021 | Trester | H01L 27/0207 |
| 2021/0028472 A1* | 1/2021 | Tao | G06F 30/10 |
| 2021/0042461 A1* | 2/2021 | Hu | H01L 29/42376 |
| 2021/0090627 A1* | 3/2021 | Gupta | G11C 11/1655 |
| 2021/0110094 A1* | 4/2021 | Lin | H01L 27/0207 |
| 2021/0165946 A1* | 6/2021 | Chae | G06F 30/392 |
| 2021/0232749 A1* | 7/2021 | Lin | G06F 30/394 |
| 2021/0240896 A1* | 8/2021 | Ayyagari | G06F 30/27 |
| 2021/0240900 A1* | 8/2021 | Peng | H01L 23/5226 |
| 2021/0240901 A1* | 8/2021 | Ku | G06F 30/394 |
| 2021/0334449 A1* | 10/2021 | Yu | G06F 30/392 |
| 2021/0343695 A1* | 11/2021 | Chiu | H01L 23/528 |
| 2021/0343696 A1* | 11/2021 | Chae | H01L 23/5286 |
| 2021/0343698 A1* | 11/2021 | Peng | G06F 30/3953 |
| 2021/0357561 A1* | 11/2021 | Yu | G06F 30/394 |
| 2021/0391328 A1* | 12/2021 | Sio | G06F 30/392 |
| 2021/0391850 A1* | 12/2021 | Wang | H01L 29/41791 |
| 2022/0011465 A1* | 1/2022 | Kibodeaux | G01N 33/24 |
| 2022/0012399 A1* | 1/2022 | Peng | G06F 30/392 |
| 2022/0058330 A1* | 2/2022 | Chen | H01L 21/823431 |
| 2022/0058331 A1* | 2/2022 | Lim | H01L 23/528 |
| 2022/0129614 A1* | 4/2022 | Yang | G06F 30/392 |
| 2022/0171912 A1* | 6/2022 | Sherlekar | G06F 30/3953 |
| 2022/0189945 A1* | 6/2022 | Lee | G06F 30/392 |
| 2022/0226902 A1* | 7/2022 | Bailo Gil | B22F 10/38 |
| 2022/0229965 A1* | 7/2022 | Cho | G06F 30/392 |
| 2022/0262786 A1* | 8/2022 | Yu | H01L 27/0207 |
| 2022/0309210 A1* | 9/2022 | Maiti | H01M 50/583 |

(56) References Cited

U.S. PATENT DOCUMENTS

| | | | | |
|---|---|---|---|---|
| 2022/0335193 A1 * | 10/2022 | Peng | ..................... | G06F 30/392 |
| 2022/0335197 A1 * | 10/2022 | Hsu | ...................... | G06F 30/398 |

FOREIGN PATENT DOCUMENTS

| | | | | | |
|---|---|---|---|---|---|
| CN | 108038340 A | * | 5/2018 | ............. | G06F 30/20 |
| CN | 108319791 A | * | 7/2018 | ............... | C22B 3/14 |
| CN | 108763737 A | * | 11/2018 | ............. | G06F 30/20 |
| CN | 109324291 A | * | 2/2019 | ............. | G06F 30/20 |
| CN | 111985048 A | * | 11/2020 | ............. | G06F 30/15 |
| CN | 112507526 A | * | 3/2021 | ............. | G06F 17/18 |
| CN | 112582635 A | * | 3/2021 | ............. | G06F 30/20 |
| DE | 102006059829 A1 | | 6/2008 | | |
| DE | 102019121461 B3 | * | 12/2020 | ............. | G06F 30/20 |
| JP | 59132144 A | * | 7/1984 | ........ | H01L 27/0207 |
| JP | 08316331 A | * | 11/1996 | ........ | G06F 17/5068 |
| JP | 2002043550 A | * | 2/2002 | ........ | H01L 27/0207 |
| JP | 2003209191 A | * | 7/2003 | ........ | G11C 11/4125 |
| JP | 2005092389 A | * | 4/2005 | ........ | G06F 17/5068 |
| JP | 2006252319 A | * | 9/2006 | ........ | G06F 17/5068 |
| KR | 10-2016-0023535 A | | 3/2016 | | |
| KR | 10-2016-0034167 A | | 3/2016 | | |
| TW | I470461 B | | 1/2015 | | |
| TW | I475695 B | | 3/2015 | | |
| TW | I534643 B | | 5/2016 | | |
| WO | WO-0031871 A1 | * | 6/2000 | ........ | H01L 27/0207 |

OTHER PUBLICATIONS

Office Action, dated Apr. 17, 2020, for German Intellectual Property Office Appl. No. 102017127276.3, 14 pages.

* cited by examiner

| LEGAL SITE 704.1 | LEGAL SITE 704.2 | ... | LEGAL SITE 704.p |

| LEGAL SITE 704.1 | LEGAL SITE 704.2 | ... | LEGAL SITE 704.(p-1) | LEGAL SITE 704.p |

STANDARD CELLS AND VARIATIONS THEREOF WITHIN A STANDARD CELL LIBRARY

CROSS-REFERENCE TO RELATED APPLICATIONS

The present application is a continuation of U.S. patent application Ser. No. 16/912,061, filed Jun. 25, 2020, now U.S. Pat. No. 11,182,533, which is a continuation of U.S. patent application Ser. No. 15/800,693, filed Nov. 1, 2017, now U.S. Pat. No. 10,741,539, which claims the benefit of U.S. Provisional Patent Appl. No. 62/552,049, filed Aug. 30, 2017, each of which is incorporated herein by reference in its entirety.

BACKGROUND

Advances in technology and engineering have allowed designers and manufacturers to offer more electronic devices to consumers. Often times, the designers and/or the manufacturers utilize electronic design automation (EDA), also referred to as electronic computer-aided design (ECAD), throughout the design of an electronic device. EDA represents as a category of software applications available to designers and manufacturers for designing the electronic device. Many software applications are available to design, to simulate, to analyze, and to verify the electronic device before fabrication onto an integrated circuit (IC) or semiconductor substrate. Conventional software applications to design the electronic device utilize a high-level software language at a register-transfer level (RTL) to develop a software implementation of analog and/or digital circuitry of the electronic device. These conventional software applications translate the high-level software language into a conventional electronic architectural design by interconnecting many conventional standard cells from among a conventional predefined library of standard cells to form the analog and/or digital circuitry of the electronic device onto the IC or semiconductor substrate. Conventionally, larger standard cells from among the conventional predefined library of standard cells are placed onto the IC or semiconductor substrate before smaller standard cells from among the conventional predefined library of standard cells leaving less real estate available for placement of these smaller standard cells onto the IC or semiconductor substrate. Consequentially, the IC or semiconductor substrate is often expanded to enlarge the real estate available for placement of these smaller standard cells onto the IC or semiconductor substrate. This expansion of the IC or semiconductor substrate increases real estate occupied by the analog and/or digital circuitry of the electronic device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A and 7B illustrate exemplary semiconductor layout diagrams of a second exemplary standard cell and a second exemplary standard cell variation corresponding to the second exemplary standard cell, respectively, according to exemplary embodiments of the present disclosure;

DETAILED DESCRIPTION

Figure 1A:
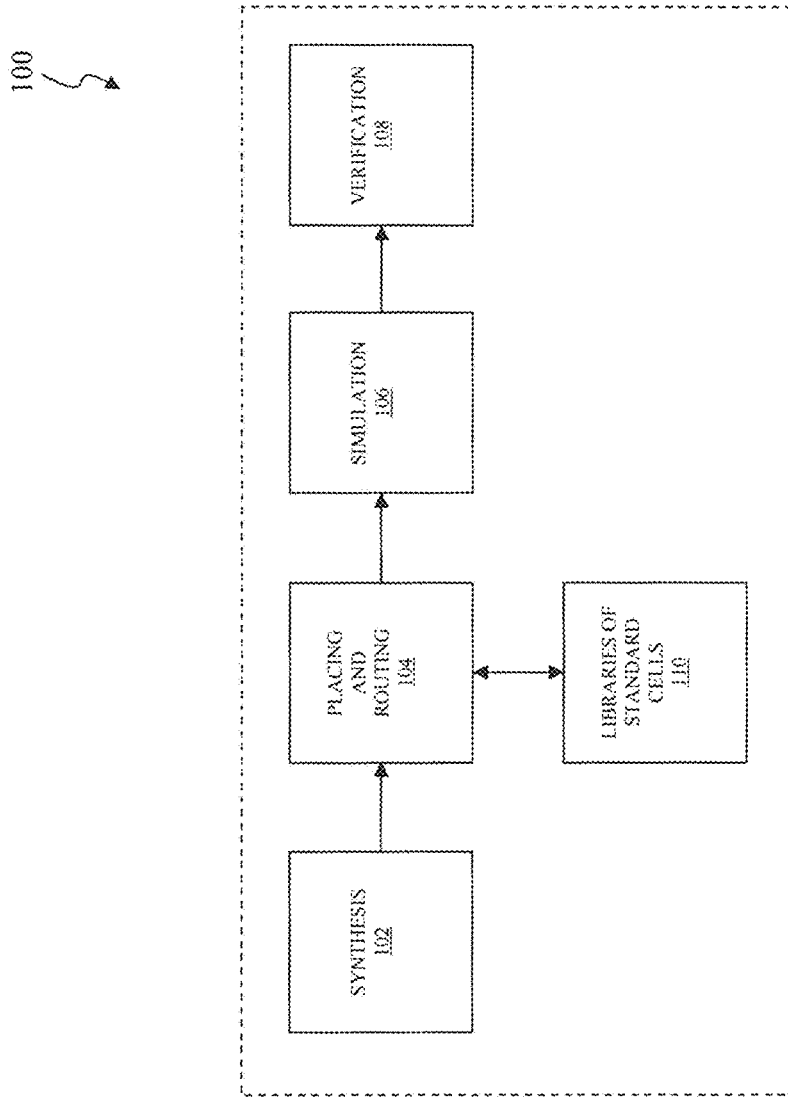
FIG. 1A illustrates a block diagram of a first electronic design platform according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

Overview

Exemplary embodiments for multiple standard cell libraries are disclosed that include one or more standard cells and one or more corresponding standard cell variations. The one or more standard cell variations have similar functionality as their one or more standard cells but are different from their one or more standard cells in terms of geometric shapes, locations of the geometric shapes, and/or interconnections between the geometric shapes. The exemplary systems and methods described herein selectively choose from among the one or more standard cells and/or the one or more standard cell variations to form an electronic architectural design for analog circuitry and/or digital circuitry of an electronic device. In an exemplary embodiment, a semiconductor foundry and/or semiconductor technology node can impose one or more electronic design constraints on the placement of the one or more standard cells onto an electronic device design real estate. In some situations, some of the one or more standard cells are unable to satisfy the one or more electronic design constraints when placed onto the electronic device design real estate. In these situations, the one or more standard cell variations corresponding to these standard cells are placed onto the electronic device design real estate.

Exemplary Electronic Design Platforms

FIG. 1A illustrates a block diagram of a first electronic design platform according to an exemplary embodiment of the present disclosure. As illustrated in FIG. 1A, an electronic design platform 100 represents a design flow including one or more electronic design software applications, that when executed by one or more computing devices, processors, controllers, or other devices that will be apparent to those skilled in the relevant art(s) without departing from the spirit and the scope of the present disclosure, can design, simulate, analyze, and/or verify one or more high-level software level descriptions of analog and/or digital circuitry for an electronic device. In an exemplary embodiment, the one or more high-level software level descriptions can be implemented using a high-level software language, such as a graphical design application, for example C, System C, C++, LabVIEW, and/or MATLAB, a general purpose system design language, such as like SysML, SMDL and/or SSDL, or any other suitable high-level software or general purpose system design language that will be apparent to those skilled in the relevant art(s) without departing from the spirit and the scope of the present disclosure, or a high-level software format, such as Common Power Format (CPF), Unified Power Formant (UPF), or any other suitable high-level software format that will be apparent to those skilled in the relevant art(s) without departing from the spirit and the scope of the present disclosure. In the exemplary embodiment illustrated in FIG. 1A, the electronic design platform 100 includes a synthesis application 102, a placing and routing application 104, a simulation application 106, a verification application 108, and libraries of standard cells 110.

Moreover, embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc. In an exemplary embodiment, the synthesis application 102, the placing and routing application 104, the simulation application 106, and the verification application 108 represent one or more electronic design software applications, which when executed by one or more computing devices, processors, controllers, or other devices that will be apparent to those skilled in the relevant art(s) without departing from the spirit and the scope of the present disclosure, configure the one or more computing devices, the processors, the controllers, or the other devices from being general purpose electronic devices into special purpose electronic devices to execute one or more of these applications as to be described in further detail below.

The synthesis application 102 translates one or more characteristics, parameters, or attributes of the electronic device into one or more logic operations, one or more arithmetic operations, one or more control operations, and/or any other suitable operation or operations that will be apparent to those skilled in the relevant art(s) without departing from the spirit and the scope of the present disclosure into the one or more high-level software level descriptions in terms of analog circuitry and/or digital circuitry of the electronic device. The synthesis application 102 can utilize a simulation algorithm to simulate the one or more logic operations, one or more arithmetic operations, one or more control operations, and/or the other suitable operation or operations to verify the one or more logic operations, one or more arithmetic operations, one or more control operations, and/or the other suitable operation perform in accordance with one or more characteristics, parameters, or attributes of the electronic device as outlined in an electronic design specification.

The placing and routing application 104 translates the one or more high-level software level descriptions to form an electronic architectural design for the analog circuitry and/or the digital circuitry of the electronic device. The placing and routing application 104 selectively chooses among one or more standard cells within libraries of standard cells 110 and/or one or more standard cell variations within the libraries of standard cells 110 corresponding to the one or more standard cells to translate the one or more logic operations, the one or more arithmetic operations, the one or more control operations, and/or the other suitable operation or operations of the one or more high-level software level descriptions into geometric shapes and/or the interconnections between the geometric shapes to form the electronic architectural design for the analog circuitry and/or the digital circuitry of the electronic device. Generally, the one or more standard cell variations have similar functionality as their corresponding standard cell but are different from their corresponding standard cell in terms of the geometric shapes, the locations of the geometric shapes, and/or the interconnections between the geometric shapes. As such, the one or more standard cell variations allow the placing and routing application 104 to selectively choose one or more variations for the one or more standard cells without expansion of an electronic device design real estate to place one or more larger standard cells within libraries of standard cells 110 have similar functionality as the one or more standard cells.

In an exemplary embodiment, the libraries of standard cells 110 include multiple standard cells defining various geometric shapes, locations of the various geometric shapes, and/or interconnections between the various geometric shapes. In this exemplary embodiment, one or more of the multiple standard cells within the libraries of standard cells 110 correspond to one or more standard cell variations within the libraries of standard cells 110. Alternatively, or in addition to, in this exemplary embodiment, only subset of the multiple standard cells within the libraries of standard cells 110 correspond to the one or more standard cell variations within the libraries of standard cells 110. This subset of the multiple standard cells within the libraries of standard cells 110 can be used to significant reduce the size of the libraries of standard cells 110. For example, the libraries of standard cells 110 can be significantly compacted by only including one or more standard cell variations for small standard cells, also referred to as critical standard cells, from among the multiple standard cells requiring less than or equal a threshold number of legal sites onto the electronic device design real estate. This exemplary embodiment further increases the efficiency of the placing and routing application 104 to form the electronic architectural design. Exemplary embodiments of the libraries of standard cells 110 are to be further described below in FIG. 2 through 7B.

After selecting the one or more standard cells from the among libraries of standard cells 110, the placing and routing application 104 places the one or more selected standard cells onto an electronic device design real estate to initiate formation of the electronic architectural design for the analog circuitry and/or the digital circuitry of the electronic device. In an exemplary embodiment, the placing and routing application 104 places standard cells from among the one or more selected standard cells occupying more real estate onto the electronic device design real estate before placing those standard cells from among the one or more selected standard cells occupying less real estate onto the electronic device design real estate. Additionally, the placing and routing application 104 verifies whether the placement of the one or more selected standard cells onto the electronic device design real estate satisfies one or more electronic design constraints. The one or more electronic design constraints can include one or more recommended parameters as defined by one or more semiconductor foundries and/or one or more semiconductor technology nodes for fabricating the electronic device. The one or more recommended parameters can include recommended geometric shapes for the one or more standard cells, recommended locations of the geometric shapes for the one or more standard cells, recommended interconnections between the geometric shapes, and/or any other suitable electronic design constraint or electronic design constraints that will be apparent to those skilled in the relevant art(s) without departing from the spirit and the scope of the present disclosure. For example, the one or more recommended parameters can include recommended locations for power, ground, and/or input/output connections for the one or more standard cells, recommended locations of one or more diffusion layers, one or more polysilicon layers, one or more metal layers, and/or one or more interconnections between the layers onto the electronic device design real estate.

In an exemplary embodiment, when the placement of the one or more standard cells from among the among the libraries of standard cells 110 satisfies the one or more electronic design constraints, this placement of the one or more standard cells represents a legal placement onto the electronic device design real estate. Otherwise, this placement of the one or more standard cells represents an illegal placement onto the electronic device design real estate when the placement of the one or more standard cells does not satisfy the one or more electronic design constraints. In this situation, the placing and routing application 104 iteratively selects one or more standard cell variations from the among the libraries of standard cells 110 which represents one or more variations of the one or more standard cells having the illegal placement and substitutes the one or more standard cell variations having the legal placement with the one or more standard cells onto the electronic device design real estate. Generally, the one or more standard cell variations have similar functionality as their respective standard cells but different are terms of the geometric shapes, the locations of the geometric shapes, and/or the interconnections between the geometric shapes. The placement of the one or more selected standard cells and the verification of whether the placement satisfies the one or more electronic design constraints are to be further described below in FIG. 8.

Once the placing and routing application 104 places the one or more selected standard cells onto the electronic device design and verifies the one or more placed standard cells satisfy the one or more electronic design constraints, the placing and routing application 104 routes the one or more placed standard cells to form the electronic architectural design for the analog circuitry and/or the digital circuitry of the electronic device. In an exemplary embodiment, the placing and routing application 104 forms various geometric shapes of conductive material between one or more placed standard cells and/or interconnections between these various geometric shapes to form the electronic architectural design for the analog circuitry and/or the digital circuitry of the electronic device.

The simulation application 106 simulates the electronic architectural design for the analog circuitry and/or the digital circuitry of the electronic device to replicate one or more characteristics, parameters, or attributes of the electronic architectural design for the analog circuitry and/or the digital circuitry of the electronic device. In an exemplary embodiment, the simulation application 106 can provide a static timing analysis (STA), a voltage drop analysis, also referred to an IREM analysis, a Clock Domain Crossing Verification (CDC check), a formal verification, also referred to as model checking, equivalence checking, or any other suitable analysis that will be apparent to those skilled in the relevant art(s) without departing from the spirit and the scope of the present disclosure. In a further exemplary embodiment, the simulation application 106 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the other suitable analysis.

The verification application 108 verifies the one or more characteristics, parameters, or attributes of the electronic architectural design for the analog circuitry and/or the digital circuitry of the electronic device as replicated by the simulation application 106 satisfy the electronic design specification. The verification application 108 can also perform a physical verification, also referred to as a design rule check (DRC), to check whether the electronic architectural design for the analog circuitry and/or the digital circuitry of the electronic device satisfies one or more recommended parameters, referred to as design rules, as defined by a semiconductor foundry and/or semiconductor technology node for fabricating the electronic device.

Figure 1B:
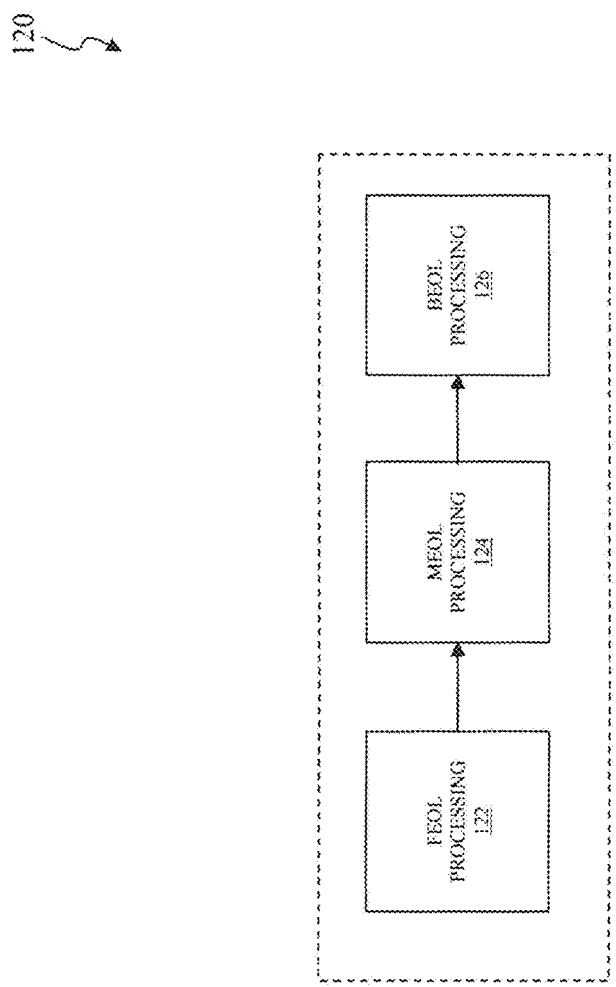
FIG. 1B illustrates a block diagram of a second electronic design platform according to an exemplary embodiment of the present disclosure.

FIG. 1B illustrates a block diagram of a second electronic design platform according to an exemplary embodiment of the present disclosure. As illustrated in FIG. 1B, an electronic design platform 120 represents a fabrication flow including one or more electronic design software applications, that when executed by one or more computing devices, processors, controllers, or other devices that will be apparent to those skilled in the relevant art(s) without departing from the spirit and the scope of the present disclosure, can perform a multiple-operation sequence of photo lithographic and chemical processing steps during which analog and/or digital circuitry for an electronic device are gradually created on a semiconductor substrate such as a silicon crystal, but can include other materials, or combinations of materials, such as sapphire or any other suitable material that will be apparent to those skilled in the relevant art(s) without departing from the spirit and scope of the present disclosure. The multiple-operation sequence of photo lithographic and chemical processing steps can include deposition, removal, patterning, and modification. The deposition is a process used to grow, coat, or otherwise transfer a material onto the semiconductor substrate and can include physical vapor deposition (PVD), chemical vapor deposition (CVD), electrochemical deposition (ECD), and/or molecular beam epitaxy (MBE) to provide some examples. The removal is a process to remove material from the semiconductor substrate and can include wet etching, dry etching, and/or chemical-mechanical planarization (CMP) to provide some examples. The patterning, often referred to as lithography, is a process to shape or alter material of the semiconductor substrate to form various geometric shapes of the analog and/or digital circuitry for the electronic device. The modification of electrical properties is a process to alter physical, electrical, and/or chemical properties of material of the semiconductor substrate, typically, by ion implantation. In an exemplary embodiment, a semiconductor foundry can utilize this fabrication flow to fabricate the analog and/or digital circuitry for the electronic device on the semiconductor substrate. In the exemplary embodiment illustrated in FIG. 1B, the fabrication flow can be divided into front-end-of-line (FEOL) processing, middle-end-of-line (MEOL) processing, and back-end-of-line (BEOL) processing. In this embodiment, the electronic design platform 120 includes a FEOL processing application 122, a MEOL processing application 124, and a BEOL processing application 126 as illustrated in FIG. 1B.

The FEOL processing application 122 forms one or more semiconductor devices of the analog and/or digital circuitry onto one or more diffusion layers and/or one or more polysilicon layers within the semiconductor substrate in accordance with an electronic architectural design for the analog circuitry and/or the digital circuitry of the electronic device. The FEOL processing application 122 can include forming one or more wells within the semiconductor substrate and forming various terminals, such as gates, sources, and drains to provide some examples, of the one or more semiconductor devices of the analog and/or digital circuitry within and/or onto the semiconductor substrate. In an exemplary embodiment, the electronic architectural design represents an image or a data-based representation of geometric shapes describing circuitry of the electronic device, locations of the geometric shapes, and/or interconnections of the geometric shapes. The electronic architectural design can represent one or more JPEG (Joint Photographic Experts Group) images, JPEG File Interchange Format (JIFF) images, Exchangeable image file (Exif) images, Tagged Image File Format (TIFF) images, Graphics Interchange Format (GIF) images, Windows bitmap (BMP) images, and/or Portable Network Graphic (PNG) images, AutoCAD Drawing Exchange Format (DXF) data files, Portable Document Format (PDF) data files, Electronic Design Interchange Format (EDIF) data files, ODB++ data files, one or more Association Connecting Electronics Industries (IPC) data files, such as IPC-2511A, IPC-2511B, or IPC-2581 to provide some examples, one or more International Organization for Standardization (ISO) data files, such as ISO 10303-210 to provide an example. In the exemplary embodiment illustrated in FIG. 1B, the electronic architectural design was formed using one or more standard cells and/or one or more standard cell variations corresponding to the one or more standard cells from among one or more libraries of standard cells in a similar manner as described above in FIG. 1A.

The MEOL processing application 124 forms one or more local interconnections, such as one or more vias and/or one or more contacts to provide some examples, in accordance with the electronic architectural design for electrically connecting the one or more semiconductor devices. In the exemplary embodiment illustrated in FIG. 1B, the one or more local interconnections represent various connections for one or more global interconnections between the one or more semiconductor devices for electrically connecting the one or more semiconductor devices of the analog and/or digital circuitry.

Figure 2:
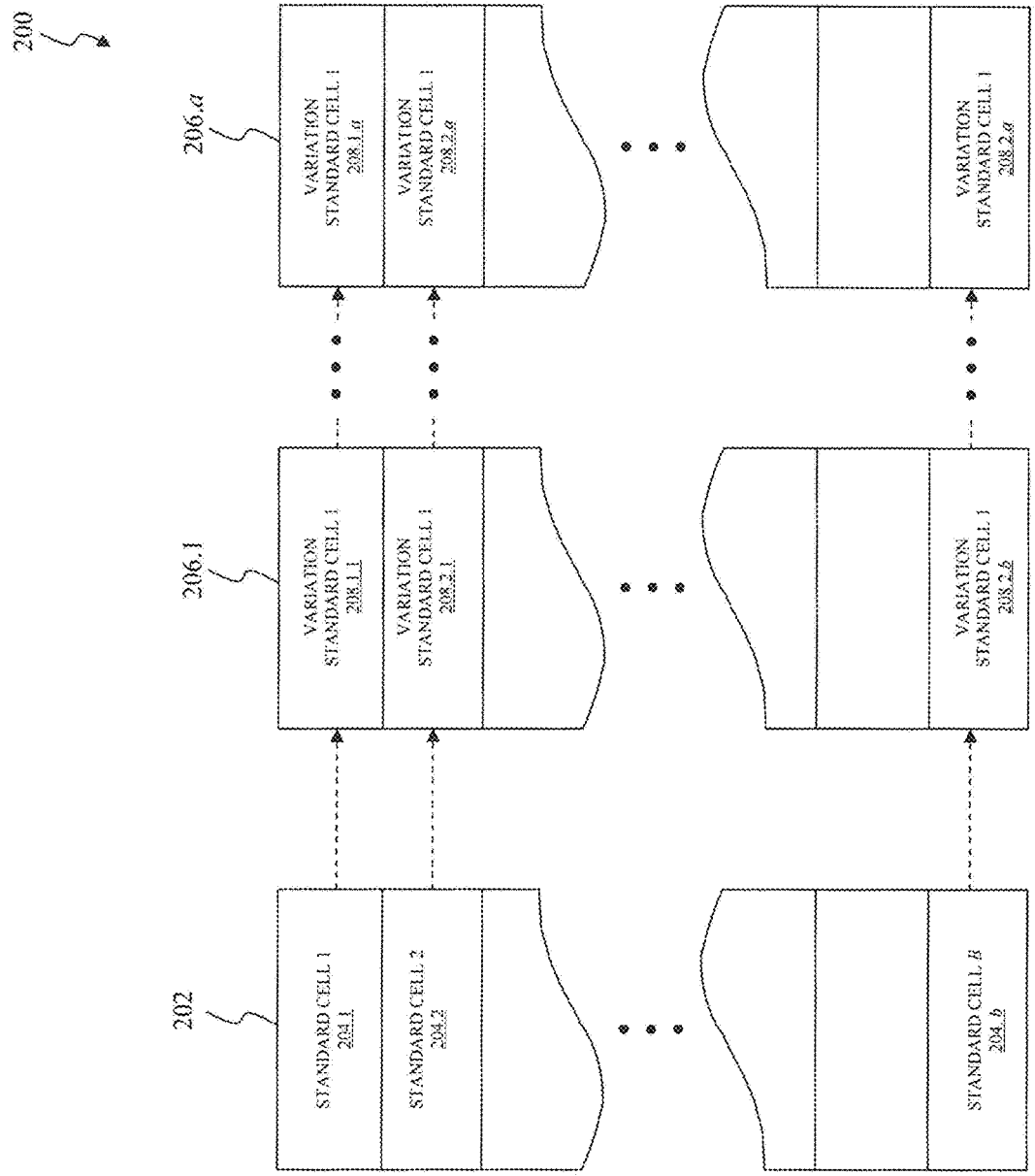
FIG. 2 illustrates exemplary libraries of standard cells according to an exemplary embodiment of the present disclosure.

The BEOL processing application 126 forms the one or more global interconnections between the local interconnections in accordance with the electronic architectural design to form the analog circuitry and/or the digital circuitry of the electronic device Exemplary Libraries of Standard Cells That Can be Utilized by the Exemplary Electronic Design Platform FIG. 2 illustrates exemplary libraries of standard cells according to an exemplary embodiment of the present disclosure. The placing and routing application 104, as described above in FIG. 1A, selects one or more standard cells and/or one or more standard cell variations corresponding to the one or more standard cells from among the libraries of standard cells, such as libraries of standard cells 200 as illustrated in FIG. 2, for placement onto an electronic device design real estate in accordance with the one or more high-level software level descriptions for the analog circuitry and/or the digital circuitry of the electronic device. As illustrated in FIG. 2, the libraries of standard cells 200 include a standard cell library 202, having standard cells 204.1 through 204.*b*, associated with standard cell variation libraries 206.1 through 206.*a* having standard cell variations 208.1.1 through 208.*b*.1 and standard cell variations 208.1.*a* through 208.*b*.*a*, respectively. The libraries of standard cells 200 can represent an exemplary embodiment of the libraries of standard cells 110 as described above in FIG. 1A. In an exemplary embodiment, a semiconductor foundry can develop the standard cell variation libraries 206.1 through 206.*a* from the standard cell library 202 and/or deliver the standard cell variation libraries 206.1 through 206.*a* to one or more customers of the semiconductor foundry to design, to simulate, to analyze, and/or to verify the analog circuitry and/or the digital circuitry of the electronic device.

In the exemplary embodiment illustrated in FIG. 2, the standard cells 204.1 through 204.*b* represent geometric shapes, locations of the geometric shapes, and/or interconnections between the geometric shapes which can be used to form the electronic architectural design for the analog circuitry and/or the digital circuitry of the electronic device. As illustrated in FIG. 2, the standard cell variations 208.1.1 through 208.*b*.1 within the standard cell variation library 206.1 and the standard cell variations 208.1.*a* through 208.*b*.*a* within the standard cell variation library 206.*a* represent one or more standard cell variations of the standard cells 204.1 through 204.*b* within the standard cell library 202. For example, the standard cell variations 208.1.1 through 208.*b*.1 represent a first variation of the standard cells 204.1 through 204.*b* and the standard cell variations 208.1.*a* through 208.*b.a* represent an $a^{th}$ variation of the standard cells 204.1 through 204.*b*. The standard cell variations 208.1.1 through 208.*b*.1 and the standard cell variations 208.1.*a* through 208.*b.a* have similar functionality as the standard cells 204.1 through 204.*b*, but respectively differ from each other in terms of geometric shapes, locations of the geometric shapes, and/or interconnections between the geometric shapes. Although FIG. 2 illustrates the standard cell variation library 206.1 having standard cell variations 208.1.1 through 208.*b*.1 and the standard cell variation library 206.*a* having standard cell variations 208.1.*a* through 208.*b.a*, this is for illustrative purposes only. Those skilled in the relevant art(s) will recognize the standard cell variation libraries 206.1 through 206.*a* can include different variations of the standard cells 204.1 through 204.*b* without departing from the spirit and the scope of the present disclosure. In an exemplary embodiment, the standard cell variation library 206.1 can include at least the standard cell variation 208.1.1 and the standard cell library 206.*a* can include at least the standard cell variation 208.1.*a*. In some situations, not all of the standard cells 204.1 through 204.*b* need to be associated with a standard cell variation library from among the standard cell variation libraries 206.1 through 206.*a* as illustrated in FIG. 2 to reduce the size needed for the libraries of standard cells 200.

Exemplary Selection of Standard Cells for One or More Standard Cell Variations

Figure 3:
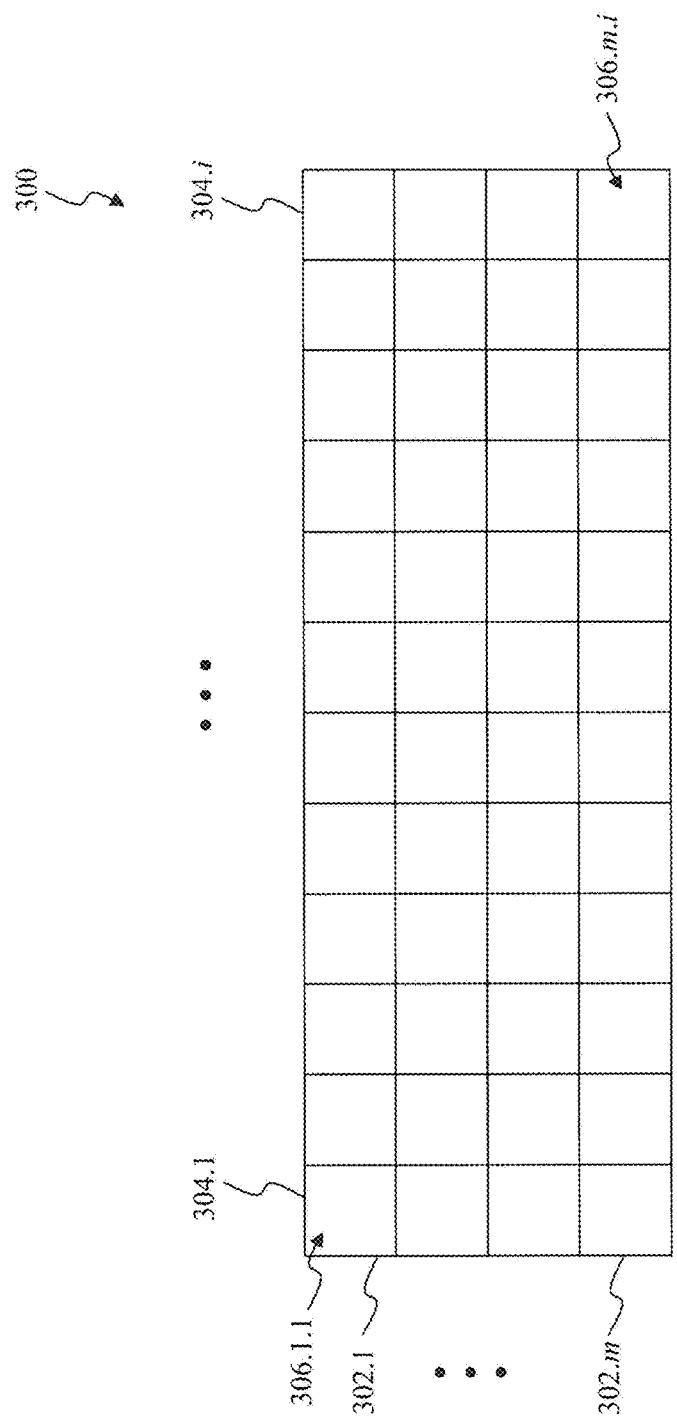
FIG. 3 illustrates an electronic device design real estate for placement of analog circuitry and/or digital circuitry of an electronic device according to an exemplary embodiment of the present disclosure.

FIG. 3 illustrates an electronic device design real estate for placement of analog circuitry and/or digital circuitry of an electronic device according to an exemplary embodiment of the present disclosure. In the exemplary embodiment illustrated in FIG. 3, an electronic device design real estate 300 can be logically divided into a series of rows 302.1 through 302.*m* of legal sites intersecting a series of columns of legal sites 304.1 through 304.*i* to form an array of legal sites 306.1.1 through 306.*m.i*. The array of legal sites 306.1.1 through 306.*m.i* can be used to place one or more standard cells, such as the one or more standard cells and/or the one or more standard cell variations as described above in FIG. 1A and/or the standard cells 204.1 through 204.*b* and/or the standard cell variations 208.1.1 through 208.*b*.1 and the standard cell variations 208.1.*a* through 208.*b.a* as described above in FIG. 2 to provide some examples. However, the array of legal sites 306.1.1 through 306.*m.i* as illustrated in FIG. 3 is for illustrative purposes only. Those skilled in the relevant art(s) will recognize the electronic device design real estate 300 can be logically divided into other configurations and arrangements of legal sites without departing from the spirit and the scope of the present disclosure. Generally, the legal sites represent basic units of integrated circuit design for placing the one or more standard cells. As such, each of the one or more standard cells can be characterized as requiring one or more of the legal sites from among the array of legal sites 306.1.1 through 306.*m.i* for placement onto the electronic device design real estate 300.

Figure 4:
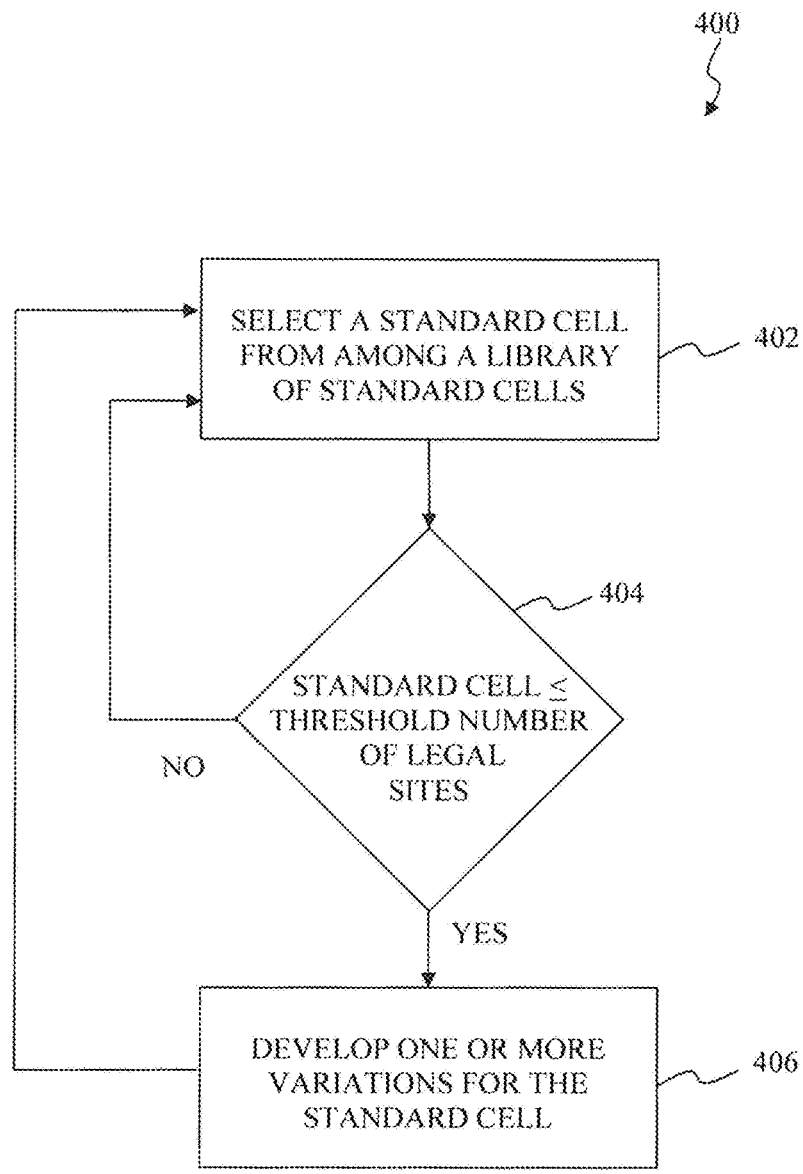
FIG. 4 illustrates a flowchart of exemplary operation for developing the exemplary libraries of standard cells according to an exemplary embodiment of the present disclosure.

FIG. 4 illustrates a flowchart of exemplary operation for developing the exemplary libraries of standard cells according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for developing exemplary libraries of standard cells, such as the libraries of standard cells 110 as described above in FIG. 1A and/or the libraries of standard cells 200 as described above in FIG. 2 to provide some examples. In an exemplary embodiment, the operational control flow 400 can be utilized by a semiconductor foundry to develop the libraries of standard cells and/or deliver the libraries of standard cells to one or more customers of the semiconductor foundry to design, to simulate, to analyze, and/or to verify the analog circuitry and/or the digital circuitry of the electronic device.

At operation 402, the operational control flow 400 selects a standard cell from among the libraries of standard cells, such one of the standard cells from among the libraries of standard cells 110 as described above in FIG. 1A and/or one of the standard cells 204.1 through 204.*b* from among the standard cell library 202 as described above in FIG. 2. The standard cell includes geometric shapes, locations of the geometric shapes, and/or interconnections between the geometric shapes can be used to implement one or more of the one or more logic operations, the one or more arithmetic operations, the one or more control operations, and/or any other suitable operation or operations that will be apparent to those skilled in the relevant art(s) without departing from the spirit and the scope of the present disclosure of the one or more high-level software level descriptions for the analog circuitry and/or the digital circuitry of the electronic device.

At operation 404, the operational control flow 400 determines whether to develop one or more standard cell variations for the standard cell from operation 402. In the exemplary embodiment illustrated in FIG. 4, the operational control flow 400 compares a size of the standard cell from operation 402, in terms of legal sites, with a threshold number of legal sites to determine whether to develop the one or more standard cell variations for the standard cell from operation 402. In some situations, a placing and routing application, such as the placing and routing application 104 to provide an example, places large standard cells from among the one or more standard cells requiring more than the threshold number of legal sites, for example five, onto an electronic device design real estate, such as the electronic device design real estate 300 to provide an example, before placement of small standard cells, also referred to as critical standard cells, from among the one or more selected standard cells requiring less than or equal the threshold number of legal sites onto the electronic device design real estate. In these situations, after placement of the large standard cells onto the electronic device design real estate, less legal sites are available within the electronic device design real estate for placement of these critical standard cells. As such, the operational control flow 400 develops one or more standard cell variations for these critical standard cells in the exemplary embodiment illustrated in FIG. 4. When the size of the standard cell from operation 402 is greater than the threshold number of legal sites, the standard cell from operation 402 represents a large standard cell. In this situation, the one or more standard cell variations are not developed for the standard cell from operation 402 and the operational control flow 400 reverts to operation 402 to select another standard cell from among the library of standard cells. Otherwise, the operational control flow 400 proceeds to operation 406 to develop the one or more standard cell variations for the standard cell from operation 402 when the size of the standard cell from operation 402 is less than or equal to the threshold number of legal sites.

At operation 406, the operational control flow 400 develops the one or more standard cell variations for the standard cell from operation 402. In the exemplary embodiment illustrated in FIG. 4, the operational control flow 400 develops the one or more standard cell variations for the standard cell from operation 402 to satisfy one or more electronic design constraints. The one or more electronic design constraints can include one or more recommended parameters as defined by one or more semiconductor foundries and/or one or more semiconductor technology nodes for fabricating the electronic device. The one or more recommended parameters can include recommended geometric shapes for the one or more standard cells, recommended locations of the geometric shapes for the one or more standard cells, recommended interconnections between the geometric shapes, and/or any other suitable electronic design constraint or electronic design constraints that will be apparent to those skilled in the relevant art(s) without departing from the spirit and the scope of the present disclosure. For example, the one or more recommended parameters can include recommended locations for power, ground, and/or input/output connections for the one or more standard cells, recommended locations of one or more diffusion layers, one or more polysilicon layers, one or more metal layers, and/or one or more interconnections between the layers onto the electronic device design real estate. However, in some situations, the standard cell from operation 402 can be mirrored along a linear axis, such as along an "x" axis of a Cartesian coordinate system or a "y" axis of a Cartesian coordinate system to provide some examples, to satisfy the one or more electronic design constraints. This mirrored standard cell has similar functionality as the standard cell from operation 402 but the geometric shapes, the locations of the geometric shapes, and/or the interconnections between the geometric shapes of the mirrored standard cell of the mirrored standard cell are mirrored about the linear axis when compared to the standard cell from operation 402. In these situations, the operational control flow 400 does not develop the one or more standard cell variations for the standard cell from operation 402. Rather, the operational control flow 400 reverts to operation 402 to select another standard cell from among the library of standard cells. Referring back to FIG. 4, after developing the one or more standard cell variations for the standard cell from operation 402, the operational control flow 400 reverts to operation 402 to select another standard cell from among the library of standard cells. In an exemplary embodiment, the operational control flow 400 can deliver the libraries of standard cells to the one or more customers of the semiconductor foundry to design, to simulate, to analyze, and/or to verify the analog circuitry and/or the digital circuitry of the electronic device after developing the one or more standard cell variations for the standard cell from operation 402.

Exemplary Variations for the One or More Standard Cells

Figure 5B:
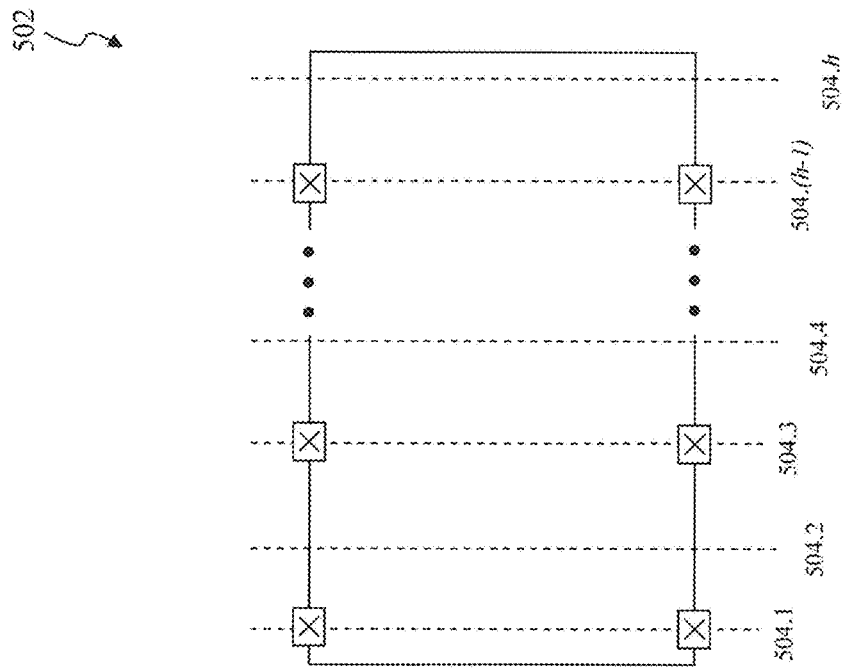
FIG. 5A and 5B illustrate exemplary semiconductor layout diagrams of a first exemplary standard cell and a first exemplary standard cell variation corresponding to the first exemplary standard cell, respectively, according to exemplary embodiments of the present disclosure.
Figure 5A:
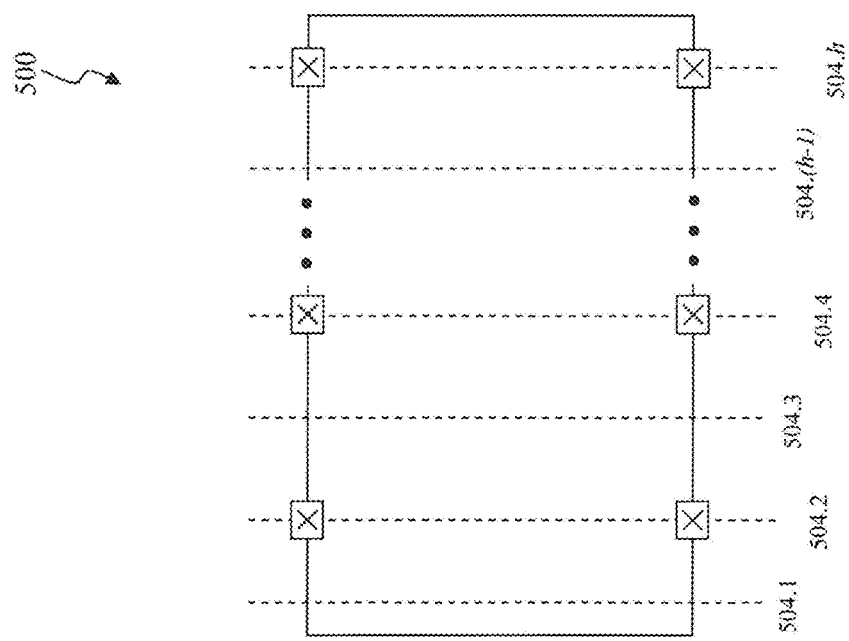

FIG. 5A and 5B illustrate exemplary semiconductor layout diagrams of a first exemplary standard cell and a first exemplary standard cell variation corresponding to the first exemplary standard cell, respectively, according to exemplary embodiments of the present disclosure. FIG. 5A and FIG. 5B illustrate simplified exemplary layout diagrams of a standard cell 500 and a standard cell variation 502, respectively, situated within a semiconductor stack. The semiconductor stack includes one or more diffusion layers, one or more polysilicon layers, and/or one or more metal layers as well as one or more interconnections between these layers. For simplicity, FIG. 5A and FIG. 5B illustrate the one or more interconnections between these layers. Those skilled in the relevant art(s) will recognize the standard cell 500 and the standard cell variation 502 can include the one or more diffusion layers, the one or more polysilicon layers, and/or the one or more metal layers without departing from the spirit and the scope of the present disclosure.

As discussed above, the one or more semiconductor foundries and/or the one or more semiconductor technology nodes can impose the one or more electronic design constraints onto the one or more diffusion layers, the one or more polysilicon layers, and/or the one or more metal layers as well as the one or more interconnections between these layers. The one or more electronic design constraints can restrict legal sites within an electronic device design real estate, such as the electronic device design real estate 300 to provide an example, which can be utilized for placement of the standard cell 500 and/or the standard cell variation 502. As illustrated in FIG. 5A and FIG. 5B, the standard cell 500 and the standard cell variation 502 include the one or more interconnections, illustrated as one or more squared "x" in FIG. 5A and FIG. 5B, to electrically connect the standard cell 500 and the standard cell variation 502, respectively, to various electrical potentials, such as a power potential and/or a ground potential to provide some examples.

In the exemplary embodiment illustrated in FIG. 5A and FIG. 5B, the one or more semiconductor foundries and/or the one or more semiconductor technology nodes recommend one or more locations for the one or more interconnections within the electronic device design real estate. For example, a 12 nm semiconductor technology node, as also referred to as a N12 semiconductor technology node, recommends the one or more interconnections be located at least twice a minimum spacing, also referred to as a polysilicon pitch, between various polysilicon regions within the one or more polysilicon layers of the semiconductor stack. In this example as illustrated in FIG. 5A, the one or more interconnections of the standard cell 500 can coincide with even numbered electrical design tracks 504.2 through 504.$h$ from among electrical design tracks 504.1 through 504.$h$ to satisfy the location for the one or more interconnections by the N12 semiconductor technology node. The electrical design tracks 504.1 through 504.$h$ represent logical electrical design tracks within the electronic device design real estate for placement of the standard cell 500 and/or the standard cell variation 502. In the exemplary embodiment illustrated in FIG. 5A and 5B, the electrical design tracks 504.1 through 504.$h$ are separated from each other by at least one polysilicon pitch. Similarly in this example as illustrated in FIG. 5B, the one or more interconnections of the standard cell variation 502 can coincide with odd numbered electrical design tracks 504.1 through 504.($h$-1) from among the electrical design tracks 504.1 through 504.$h$ to satisfy the location for the one or more interconnections by the N12 semiconductor technology node. In the exemplary embodiment illustrated in FIG. 5B, the standard cell variation 502 has a similar functionality as the standard cell 500, but differs from the standard cell 500 in placement of the one or more interconnections.

Figure 6B:
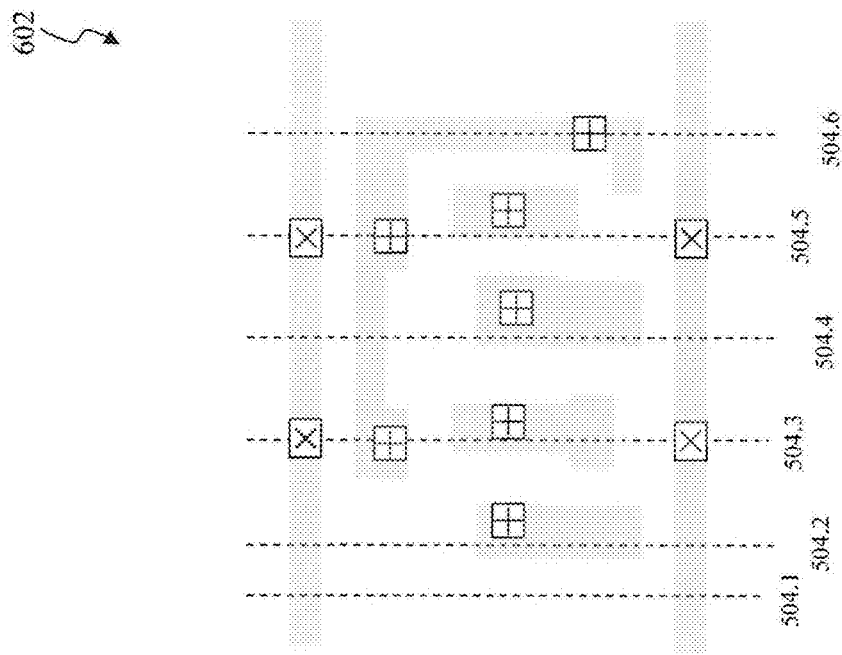
FIG. 6A and 6B further illustrate the exemplary semiconductor layout diagrams of the first exemplary standard cell and the first exemplary standard cell variation corresponding to the first standard cell, respectively, according to exemplary embodiments of the present disclosure.
Figure 6A:
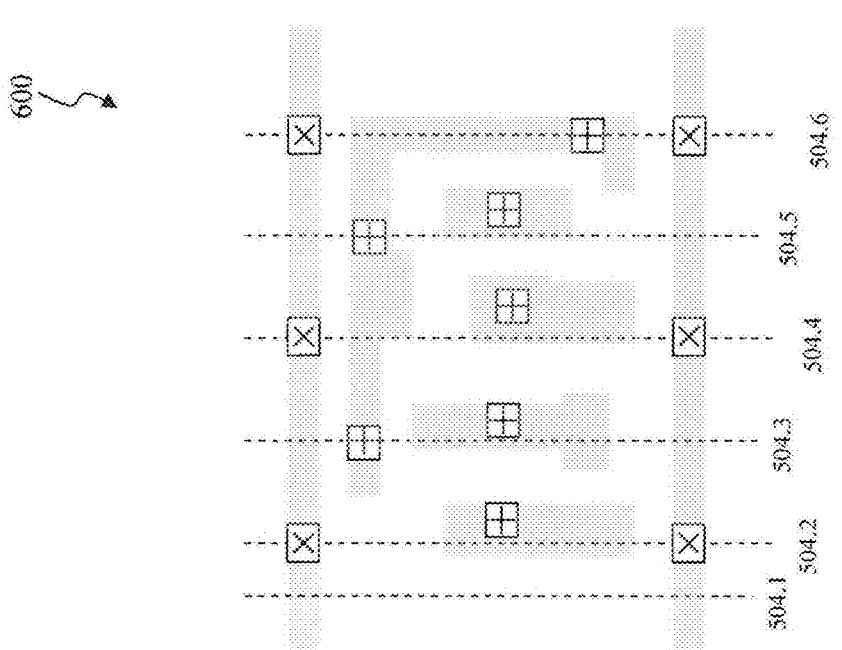

FIG. 6A and 6B further illustrate the exemplary semiconductor layout diagrams of the first exemplary standard cell and the first exemplary standard cell variation corresponding to the first standard cell, respectively, according to exemplary embodiments of the present disclosure. FIG. 6A and FIG. 6B illustrate simplified exemplary layout diagrams of a standard cell 600 for a logical NAND gate and a standard cell variation 602 for the logical NAND gate, respectively, situated within a semiconductor stack. The standard cell 600 and the standard cell variation 602 can represent exemplary embodiments of the standard cell 500 as described above in FIG. 5A and the standard cell variation 502 as described above in FIG. 5B.

As illustrated in FIG. 6A, the standard cell 600 includes the one or more interconnections, illustrated as the one or more squared "x" in FIG. 6A and FIG. 6B, situated in even numbered electrical design tracks 504.2, 504.4, and 504.6 from among the electrical design tracks 504.1 through 504.6 to satisfy the location for the one or more interconnections by the N12 semiconductor technology node and the standard cell variation 602 includes the one or more interconnections situated in odd numbered electrical design tracks 504.3 and 504.5 from among the electrical design tracks 504.1 through 504.6 satisfy the location for the one or more interconnections by the N12 semiconductor technology node. Moreover, FIG. 6A and FIG. 6B further illustrate one or more metal layers, illustrated using gray shading in FIG. 6A and FIG. 6B, and/or one or more other interconnections, illustrated as one or more squared "+" in FIG. 6A and FIG. 6B within the semiconductor stack. As shown in FIG. 6A and FIG. 6B, geometric shapes, locations of the geometric shapes, and/or interconnections between the geometric shapes of the one or more metal layers and/or the one or more other interconnections between the one or more metal layers can also vary between the standard cell 600 and the standard cell variation 602 in some situations. Although the one or more metal layers and/or the one or more other interconnections can vary between the standard cell 600 and the standard cell variation 602, those skilled in the relevant art(s) will recognize the standard cell 600 and the standard cell variation 602 have similar functionality as each other, namely, logical NAND operations, without departing from the spirit and the scope of the present disclosure. However, those skilled in the relevant art(s) will recognize other functionality for the standard cell 600 and/or the standard cell variation 602 is possible without departing from the spirit and scope of the present disclosure.

FIG. 7A and 7B illustrate exemplary semiconductor layout diagrams of a second exemplary standard cell and a second exemplary standard cell variation corresponding to the second exemplary standard cell, respectively, according to exemplary embodiments of the present disclosure. FIG. 7A and FIG. 7B illustrate simplified exemplary layout diagrams of a standard cell 700 and a standard cell variation 702, respectively, situated within a semiconductor stack. The semiconductor stack includes one or more diffusion layers, one or more polysilicon layers, and/or one or more metal layers as well as one or more interconnections between these layers. For simplicity, FIG. 7A and FIG. 7B illustrate legal sites occupied by the standard cell 700 and the standard cell variation 702 within an electronic device design real estate, such as the electronic device design real estate 300 to provide an example. Those skilled in the relevant art(s) will recognize the standard cell 700 and the standard cell variation 702 can include the one or more diffusion layers, the one or more polysilicon layers, and/or the one or more metal layers as well as the one or more interconnections between these layers without departing from the spirit and the scope of the present disclosure.

The standard cell 700 and the standard cell variation 702 have similar functionality but different in terms of the configuration and the arrangement of the legal sites 704.1 through 704.p occupied by the standard cell 700 and the standard cell variation 702. As illustrated in FIG. 7A, the standard cell 700 is configured and arranged in a rectangular manner in a first direction, such as along an "x" axis of a Cartesian coordinate system to provide an example, to occupy legal sites 704.1 through 704.p. Also, the standard cell variation 702 is configured and arranged in a "L-shaped" manner in the first direction, to occupy the legal sites 704.1 through 704.p as illustrated in FIG. 7B. Those skilled in the relevant art(s) will recognize that other standard cell variations as possible for the standard cell 700 having other rectilinear configurations and arrangements of the legal sites 704.1 through 704.p without departing from the spirit and scope of the present disclosure.

Placement of the Standard Cells and/or the Standard Cell Variations

Figure 8:
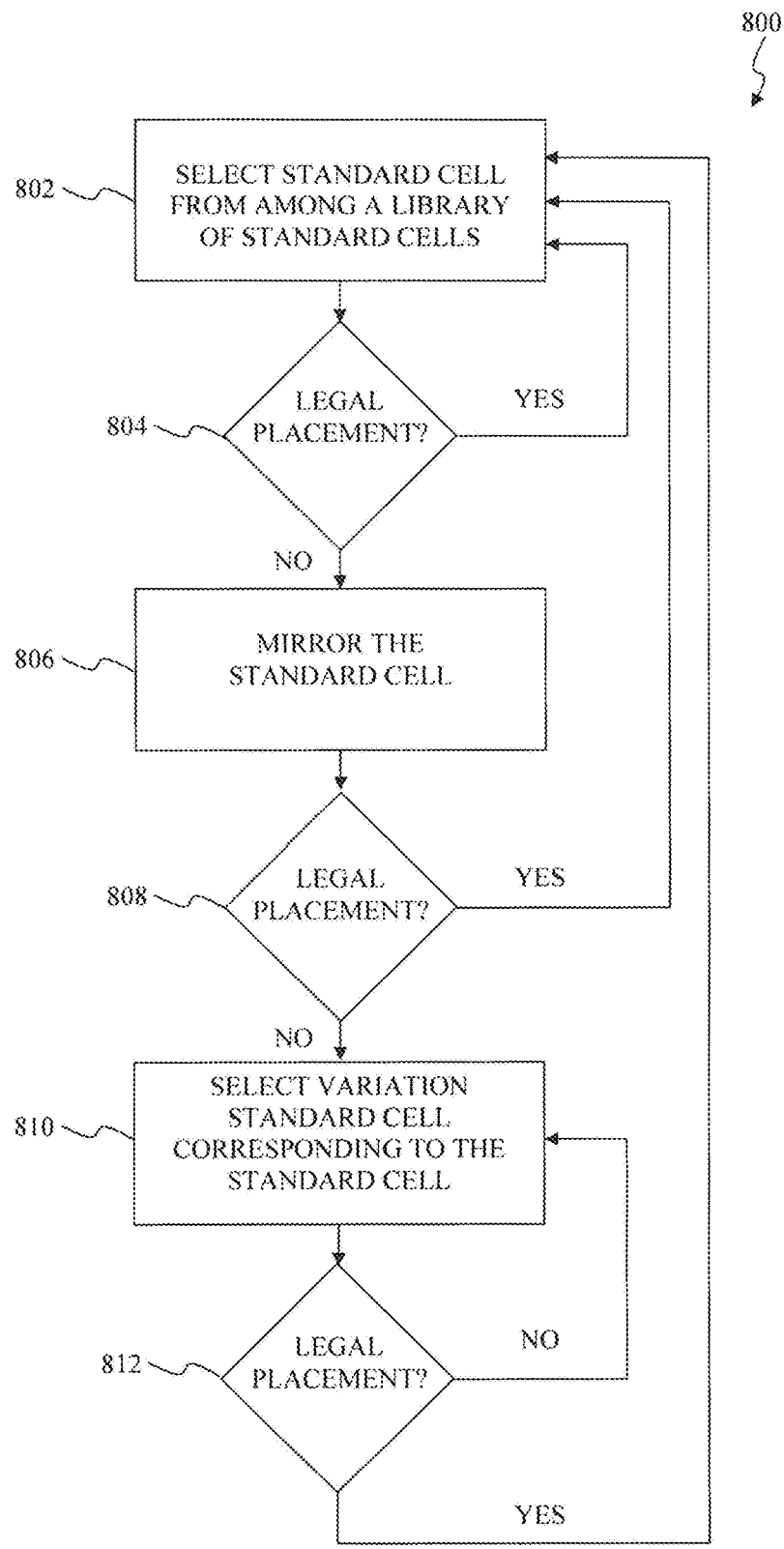
FIG. 8 illustrates a flowchart of exemplary operation for placing standard cells and/or standard cell variations from among the libraries of standard cells according to an exemplary embodiment of the present disclosure.

FIG. 8 illustrates a flowchart of exemplary operation for placing standard cells and/or standard cell variations from among the libraries of standard cells according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 800 of a placing and routing application, such as the placing and routing application 104 to provide an example, in placing one or more standard cells and/or one or more standard cell variations from among libraries of standard cells, such as the libraries of standard cells 110 as described above in FIG. 1A and/or the libraries of standard cells 200 as described above in FIG. 2 to provide some examples.

At operation 802, the operational control flow 800 selects a standard cell from among libraries of standard cells, such one of the standard cells from among the libraries of standard cells 110 as described above in FIG. 1A and/or one of the standard cells 204.1 through 204.b from among the standard cell library 202 as described above in FIG. 2, for placement onto an electronic device design real estate, such as the electronic device design real estate 300 to provide an example. The standard cell includes geometric shapes, locations of the geometric shapes, and/or interconnections between the geometric shapes which can be used to implement one or more of the one or more logic operations, the one or more arithmetic operations, the one or more control operations, and/or any other suitable operation or operations that will be apparent to those skilled in the relevant art(s) without departing from the spirit and the scope of the present disclosure of the one or more high-level software level descriptions for the analog circuitry and/or the digital circuitry of the electronic device.

At operation 804, the operational control flow 800 determines whether the placement of the standard cell from operation 802 represents a legal placement of the standard cell from operation 802 onto the electronic device design real estate. In the exemplary embodiment illustrated in FIG. 8, when the placement of the standard cell from operation 802 satisfies one or more electronic design constraints, this placement of the standard cell from operation 802 represents a legal placement of the standard cell from operation 802 onto the electronic device design real estate. The one or more electronic design constraints can include one or more recommended parameters as defined by one or more semiconductor foundries and/or one or more semiconductor technology nodes for fabricating the electronic device. The one or more recommended parameters can include recommended geometric shapes, recommended locations of the geometric shapes, recommended interconnections between the geometric shapes, and/or any other suitable electronic design constraint or electronic design constraints that will be apparent to those skilled in the relevant art(s) without departing from the spirit and the scope of the present disclosure. For example, the one or more recommended parameters can include recommended locations for power, ground, and/or input/output connections, recommended locations of one or more diffusion layers, one or more polysilicon layers, one or more metal layers, and/or one or more interconnections between the layers onto the electronic device design real estate. The operational control flow 800 reverts to operation 802 to select another standard cell from among the library of standard cells when the placement of the standard cell from operation 802 represents the legal placement of the standard cell from operation 802 onto the electronic device design real estate. Otherwise, the operational control flow 800 proceeds to operation 806 when the placement of the standard cell from operation 802 does not represent the legal placement of the standard cell from operation 802 onto the electronic device design real estate.

At operation 806, the operational control flow 800 mirrors the standard cell from operation 802 along a linear axis, such as along an "x" axis of a Cartesian coordinate system or a "y" axis of a Cartesian coordinate system to provide some examples. The mirrored standard cell has similar functionality as the standard cell from operation 802 but the geometric shapes, the locations of the geometric shapes, and/or the interconnections between the geometric shapes of the mirrored standard cell of the mirrored standard cell are mirrored about the linear axis when compared to the standard cell from operation 802.

At operation 808, the operational control flow 800 determines whether the placement of the mirrored standard cell from operation 806 represents a legal placement of the mirrored standard cell from operation 806 onto the electronic device design real estate in a substantially manner as described above in operation 804. The operational control flow 800 reverts to operation 802 to select another standard cell from among the library of standard cells when the placement of the mirrored standard cell from operation 806 represents the legal placement of the mirrored standard cell from operation 806 onto the electronic device design real estate. Otherwise, the operational control flow 800 proceeds to operation 810 when the placement of the mirrored standard cell from operation 806 does not represent the legal placement of the mirrored standard cell from operation 806 onto the electronic device design real estate.

At operation 810, the operational control flow 800 selects a standard cell variation from among libraries of standard cells, such one of the standard cell variations from among the libraries of standard cells 110 as described above in FIG. 1A and/or one of the standard cell variations 208.1.1 through 208.2.b and/or standard cell variations 208.1.a through 208.2.a from among the standard cell variation library 206.1 and the standard cell variation library 206.a, respectively, as described above in FIG. 2, for placement onto the electronic device design real estate. The standard cell variation from the among the libraries of standard cells represents a variation of the standard cell from operation 802 having similar functionality as the standard cell from operation 802 but is different in terms of the geometric shapes, the locations of the geometric shapes, and/or the interconnections between the geometric shapes.

At operation 812, the operational control flow 800 determines whether the placement of the standard cell variation from operation 810 represents a legal placement of the standard cell variation from operation 810 onto the electronic device design real estate in a substantially manner as described above in operation 804. The operational control flow 800 reverts to operation 802 to select another standard cell from among the library of standard cells when the placement of the standard cell variation from operation 810 represents the legal placement of the standard cell variation from operation 810 onto the electronic device design real estate. Otherwise, the operational control flow 800 proceeds to reverts to operation 810 to select another standard cell variation from among libraries of standard cells for placement onto the electronic device design real estate. when the placement of the standard cell variation from operation 810 does not represent the legal placement of the standard cell variation from operation 810 onto the electronic device design real estate.

Exemplary Computer System for Implementing the Exemplary Design Platform

Figure 9:
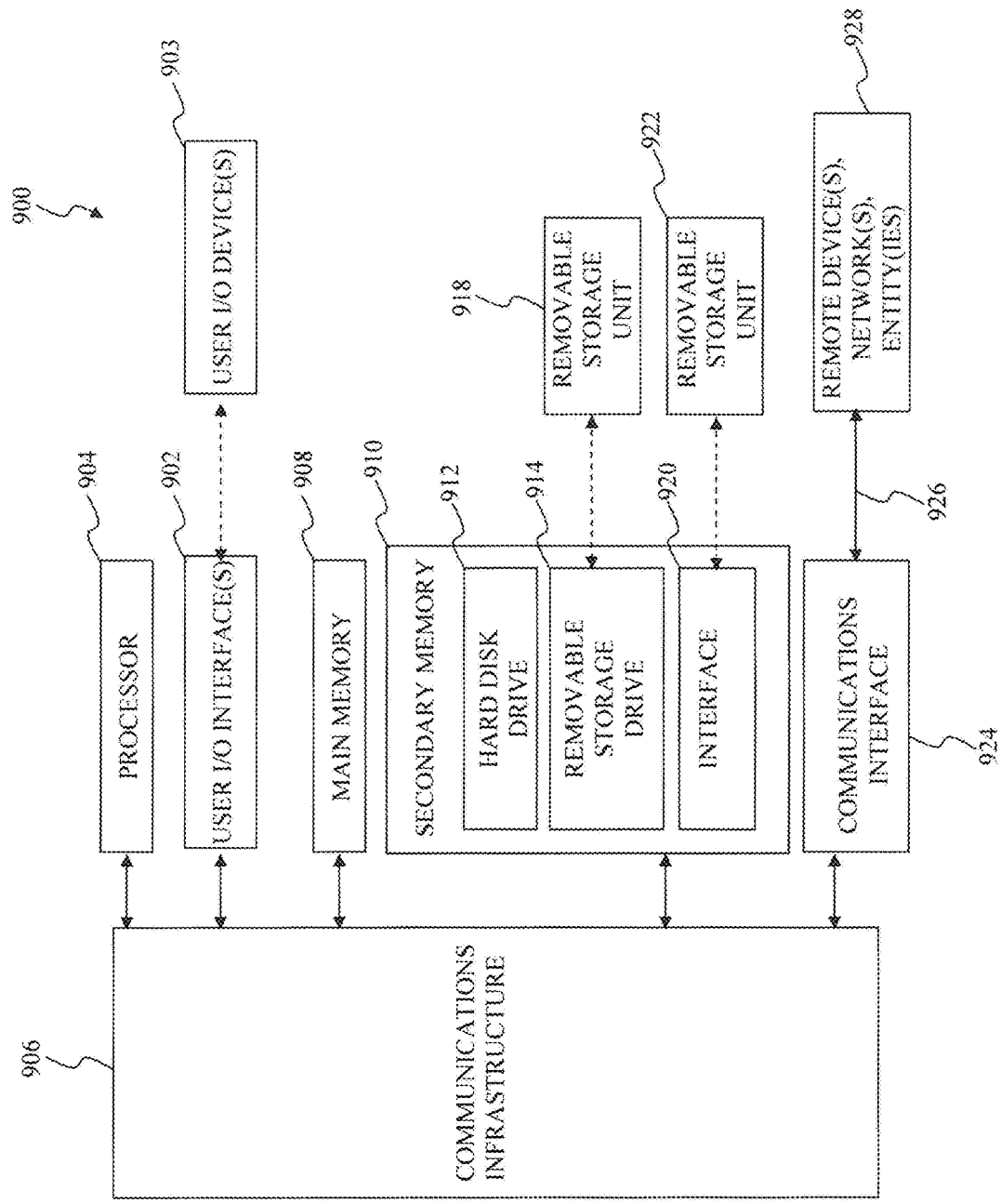
FIG. 9 illustrates a block diagram of an exemplary computer system for implementing the exemplary design platform according to an exemplary embodiment of the present disclosure.

FIG. 9 illustrates a block diagram of an exemplary computer system for implementing the exemplary design platform according to an exemplary embodiment of the present disclosure. A computer system 900 can be used to implement the electronic design platform 100 and/or the electronic design platform 120. However, in some situations, more than one computer system 900 can be used to implement the electronic design platform 100. After reading this description, it will become apparent to a person skilled in the relevant art how to implement embodiments using other computer systems and/or computer architectures.

The computer system 900 includes one or more processors 904, also referred to as central processing units, or CPUs, to execute the synthesis application 102, the placing and routing application 104, the simulation application 106, and/or the verification as described above in FIG. 1A and/or the FEOL processing application 122, the MEOL processing application 124, and the BEOL processing application 126 as described above in FIG. 1B. The one or more processors 904 can be connected to a communication infrastructure or bus 906. In an exemplary embodiment, one or more of the one or more processors 904 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 900 also includes user input/output device(s) 903, such as monitors, keyboards, pointing devices, etc., which communicate with communication infrastructure 906 through user input/output interface(s) 902.

The computer system 900 also includes a main or primary memory 908, such as a random-access memory (RAM) to provide an example. The main memory 908 can include one or more levels of cache. The main memory 908 has stored therein control logic (i.e., computer software) and/or data, such as the libraries of standard cells 110 as described above in FIG. 1A. The computer system 900 can also include one or more secondary storage devices or memory 910 to store the libraries of standard cells 110 as described above in FIG. 1A. The one or more secondary storage devices or memory 910 can include, for example, a hard disk drive 912 and/or a removable storage device or drive 914. The removable storage drive 914 may be a floppy disk drive, a magnetic tape drive, a compact disk drive, an optical storage device, tape backup device, and/or any other storage device/drive. The removable storage drive 914 may interact with a removable storage unit 918. The removable storage unit 918 includes a computer usable or readable storage device having stored thereon computer software (control logic) and/or data. The removable storage unit 918 may be a floppy disk, magnetic tape, compact disk, DVD, optical storage disk, and/any other computer data storage device. The removable storage drive 914 reads from and/or writes to removable storage unit 918 in a well-known manner.

According to an exemplary embodiment, the one or more secondary storage devices or memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 900 may further include a communication or network interface 924. The communication or network interface 924 enables the computer system 900 to communicate and interact with any combination of remote devices, remote networks, remote entities, etc. (individually and collectively referenced by reference number 928). For example, the communication or network interface 924 may allow the computer system 900 to communicate with the remote devices 928 over a communications path 926, which may be wired and/or wireless, and which may include any combination of LANs, WANs, the Internet, etc. Control logic and/or data may be transmitted to and from the computer system 900 via communication path 926. In an exemplary embodiment, the remote devices 928 can include one or more computing devices, processors, controllers, or other devices that will be apparent to those skilled in the relevant art(s) without departing from the spirit and the scope of the present disclosure, executing the electronic design platform 100 as described above in FIG. 1A. In another exemplary embodiment, the remote devices 928 can include one or more computing devices, processors, controllers, or other devices that will be apparent to those skilled in the relevant art(s) without departing from the spirit and the scope of the present disclosure, executing the electronic design platform 120 as described above in FIG. 1B.

In an embodiment, a tangible apparatus or article of manufacture comprising a tangible computer useable or readable medium having control logic (software) stored thereon is also referred to herein as a computer program product or program storage device. This includes, but is not limited to, the computer system 900, the main memory 908, the secondary memory 910, and the removable storage units 918 and 922, as well as tangible articles of manufacture embodying any combination of the foregoing. Such control logic, that when executed by one or more data processing devices (such as computer system 900), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 9. In particular, embodiments may operate with software, hardware, and/or operating system implementations other than those described herein.

CONCLUSION

The foregoing Detailed Description discloses a system for developing an electronic architectural design for an electronic device. The system includes a memory and a processor. The memory stores standard cell libraries, the standard cell libraries including standard cells and standard cell variations. The processor executes a placing and routing application. The placing and routing application, when executed by the processor, causes the processor to: place the standard cells onto an electronic device design real estate, select a first standard cell variation from among the standard cell variations that corresponds to a first standard cell from among the standard cells when the first standard cell does not satisfy an electronic design constraint, substitute the first standard cell variation for the first standard cell within the electronic device design real estate when the first standard cell does not satisfy an electronic design constraint, and route standard cells from among the standard cells placed onto the electronic device design real estate and the first standard cell variation to develop the electronic architectural design for the electronic device.

The foregoing Detailed Description additionally discloses a method for developing standard cell libraries. The method includes selecting a standard cell from among a standard cell library from among the standard cell libraries, comparing a number of legal sites occupied by the standard cell with a threshold number of legal sites, and developing a standard cell variation library including a standard cell variation corresponding to the standard cell when the number of legal sites occupied by the standard cell is less than or equal to a threshold number of legal sites.

The foregoing Detailed Description further discloses a system for fabricating an electronic device onto a semiconductor substrate. The system includes a memory and a processor. The memory stores an electronic architectural design for the electronic device, the architectural design being developed utilizing multiple standard cell variation libraries, the multiple standard cell variation libraries including multiple standard cell variations corresponding to standard cells from among multiple standard cells that occupy less than or equal to a threshold number of legal sites. The processor executes a front-end-of-line (FEOL) processing application, the FEOL, when executed by the processor, configures the processor to form one or more semiconductor devices of the electronic device within and/or onto the semiconductor substrate in accordance with the electronic architectural design.

What is claimed is:

1. A method for fabricating an electronic device onto a semiconductor substrate, the method comprising:
   receiving, by a computer system, a standard cell library having a standard cell and a standard cell variation corresponding to the standard cell from a semiconductor foundry, the standard cell and the standard cell variation were developed to occupy different arrangements of a plurality of legal sites of the electronic architectural design;
   developing, by the computer system, an electronic architectural design for the electronic device utilizing the standard cell library;
   forming, by the computer system, one or more semiconductor devices of the electronic device within or onto the semiconductor substrate in accordance with the electronic architectural design;
   forming, by the computer system, one or more local interconnections in accordance with the electronic architectural design for electrically connecting the one or more semiconductor devices; and
   forming, by the computer system, one or more global interconnections between the one or more local interconnections in accordance with the electronic architectural design to form the electronic device.

2. The method of claim 1, wherein the developing comprises:
- placing the standard cell onto electronic device design real estate;
- substituting the standard cell variation for the standard cell within the electronic device design real estate when the standard cell does not satisfy an electronic design constraint; and
- routing the standard cell or the standard cell variation to develop a portion of the electronic architectural design.

3. The method of claim 2, wherein the electronic design constraint comprises:
- one or more recommended locations for one or more power connections, one or more ground connections, or one or more input/output connections for the standard cell;
- one or more recommended locations for one or more diffusion layers, one or more polysilicon layers, or one or more metal layers for the standard cell; or
- one or more recommended locations for one or more interconnections between the one or more diffusion layers, the one or more polysilicon layers, or the one or more metal layers.

4. The method of claim 1, wherein the standard cell, including a first plurality of geometric shapes and a first plurality of interconnections, is configured and arranged to perform a function, and
- wherein the standard cell variation, including a second plurality of geometric shapes and a second plurality of interconnections different from the first plurality of geometric shapes and the first plurality of interconnections, respectively, is configured and arranged to perform the function.

5. The method of claim 1, wherein the standard cell variation was developed when a number of legal sites occupied by the standard cell was less than or equal to a threshold number of legal sites.

6. The method of claim 1, wherein the standard cell is configured and arranged to occupy a first arrangement of legal sites in a first direction, and
- wherein the first arrangement of legal sites was adjusted to be a second arrangement of legal sites in the first direction and a second direction to develop the standard cell variation.

7. The method of claim 1, wherein the plurality of legal sites includes a series of rows of legal sites intersecting a series of columns of legal sites to form an array of legal sites,
- wherein the standard cell and the standard cell variation occupy a same number of legal sites from among the plurality of legal sites, and
- wherein the standard cell variation occupies more rows of legal sites from among the series of rows of legal sites than the standard cell.

8. A system for fabricating an electronic device onto a semiconductor substrate, the system comprising:
- a memory that stores an electronic architectural design for the electronic device that was developed utilizing a standard cell library having a standard cell and a standard cell variation that corresponds to the standard cell, the standard cell and the standard cell variation being developed to occupy different arrangements of a plurality of legal sites of the electronic architectural design; and
- a processor configured to execute one or more electronic design software applications, the one or more electronic design software applications, when executed by the processor, configuring the processor to:
  - form one or more semiconductor devices of the electronic device within or onto the semiconductor substrate in accordance with the electronic architectural design,
  - form one or more local interconnections in accordance with the electronic architectural design for electrically connecting the one or more semiconductor devices, and
  - form one or more global interconnections between the one or more local interconnections in accordance with the electronic architectural design to form the electronic device.

9. The system of claim 8, wherein the one or more electronic design software applications, when executed by the processor, further configure the processor to develop the electronic architectural design for the electronic device utilizing the standard cell library.

10. The system of claim 9, wherein the one or more electronic design software applications, when executed by the processor, configure the processor to:
- place the standard cell onto electronic device design real estate;
- substitute the standard cell variation for the standard cell within the electronic device design real estate when the standard cell does not satisfy an electronic design constraint; and
- route the standard cell or the standard cell variation to develop a portion of the electronic architectural design.

11. The system of claim 10, wherein the electronic design constraint comprises:
- one or more recommended locations for one or more power connections, one or more ground connections, or one or more input/output connections for the standard cell;
- one or more recommended locations for one or more diffusion layers, one or more polysilicon layers, or one or more metal layers for the standard cell; or
- one or more recommended locations for one or more interconnections between the one or more diffusion layers, the one or more polysilicon layers, or the one or more metal layers.

12. The system of claim 8, wherein the standard cell, including a first plurality of geometric shapes and a first plurality of interconnections, is configured and arranged to perform a function, and
- wherein the standard cell variation, including a second plurality of geometric shapes and a second plurality of interconnections different from the first plurality of geometric shapes and the first plurality of interconnections, respectively, is configured and arranged to perform the function.

13. The system of claim 8, wherein the standard cell variation was developed when a number of legal sites occupied by the standard cell was less than or equal to a threshold number of legal sites.

14. The system of claim 8, wherein the standard cell is configured and arranged to occupy a first arrangement of legal sites in a first direction, and
- wherein the first arrangement of legal sites was adjusted to be a second arrangement of legal sites in the first direction and a second direction to develop the standard cell variation.

15. The system of claim 8, wherein the one or more electronic design software applications, when executed by the processor, further configure the processor to receive the standard cell library from a semiconductor foundry.

16. A system for fabricating circuitry of an electronic device onto a semiconductor substrate, the system comprising:
- a memory that stores an electronic architectural design for the electronic device that was developed utilizing a standard cell library having a standard cell and a standard cell variation that corresponds to the standard cell, the standard cell and the standard cell variation being developed to occupy different arrangements of a plurality of legal sites of the electronic architectural design; and
- a processor configured to perform a sequence of photo lithographic and chemical processing steps to create the circuitry of the electronic device on the semiconductor substrate in accordance with the electronic architectural design.

17. The system of claim 16, wherein the processor is further configured to develop the electronic architectural design for the electronic device utilizing the standard cell library.

18. The system of claim 17, wherein the processor is further configured to:
- place the standard cell onto electronic device design real estate;
- substitute the standard cell variation for the standard cell within the electronic device design real estate when the standard cell does not satisfy an electronic design constraint; and
- route the standard cell or the standard cell variation to develop a portion of the electronic architectural design.

19. The system of claim 16, wherein the electronic design constraint comprises:
- one or more recommended locations for one or more power connections, one or more ground connections, or one or more input/output connections for the standard cell;
- one or more recommended locations for one or more diffusion layers, one or more polysilicon layers, or one or more metal layers for the standard cell; or
- one or more recommended locations for one or more interconnections between the one or more diffusion layers, the one or more polysilicon layers, or the one or more metal layers.

20. The system of claim 16, wherein the standard cell, including a first plurality of geometric shapes and a first plurality of interconnections, is configured and arranged to perform a function, and
- wherein the standard cell variation, including a second plurality of geometric shapes and a second plurality of interconnections different from the first plurality of geometric shapes and the first plurality of interconnections, respectively, is configured and arranged to perform the function.

21. The system of claim 16, wherein the standard cell variation was developed when a number of legal sites occupied by the standard cell was less than or equal to a threshold number of legal sites.

* * * * *